United States Patent [19]
Takizawa et al.

[11] Patent Number: 5,764,316
[45] Date of Patent: Jun. 9, 1998

[54] LIQUID CRYSTAL DIMMER PLATE AND LIGHTING SYSTEM INCLUDING THE SAME

[75] Inventors: Kuniharu Takizawa; Hideo Fujikake; Hiroshi Tachikawa; Osamu Kobayashi; Yoshiaki Tanaka; Masanori Nakamura; Takamichi Kasahara, all of Tokyo; Kensaku Takata, Osaka; Morihiko Katsuda, Osaka; Tohru Kashiwagi, Osaka, all of Japan

[73] Assignees: Nippon Hoso Kyokai, Tokyo; Sumitomo Electric Industries, Ltd., Osaka, both of Japan

[21] Appl. No.: 122,576

[22] PCT Filed: Nov. 12, 1992

[86] PCT No.: PCT/JP92/01479

§ 371 Date: Sep. 28, 1993

§ 102(e) Date: Sep. 28, 1993

[87] PCT Pub. No.: WO93/15433

PCT Pub. Date: Aug. 5, 1993

[30] Foreign Application Priority Data

| Jan. 30, 1992 | [JP] | Japan | 4-015475 |
| Jun. 2, 1992 | [JP] | Japan | 4-141779 |
| Jun. 2, 1992 | [JP] | Japan | 4-141780 |

[51] Int. Cl.$^6$ .............. G02F 1/1335; G02F 1/137; G03B 15/02

[52] U.S. Cl. ............ 349/1; 349/57; 349/58; 349/86; 349/114; 349/193; 362/18

[58] Field of Search .......... 359/48, 49, 51, 359/52, 66, 599; 362/16, 17, 18, 287, 307, 308, 318; 352/131, 244; 396/4, 164, 175, 205; 349/1, 113, 33, 114, 57, 58, 86, 193, 104, 105, 179

[56] References Cited

U.S. PATENT DOCUMENTS

| 3,872,246 | 3/1975 | Schneider | 348/607 |
| 4,323,952 | 4/1982 | Proske | 362/17 |
| 4,570,204 | 2/1986 | Caimi . | |
| 4,613,207 | 9/1986 | Fergason | 359/51 |

(List continued on next page.)

FOREIGN PATENT DOCUMENTS

| 0361981 | 8/1990 | European Pat. Off. . |
| 0511829 | 11/1992 | European Pat. Off. . |
| 2203530 | 5/1973 | France . |
| 59-18925 | 1/1984 | Japan . |
| 63-098631 | 4/1988 | Japan . |
| 63-91110 | 7/1988 | Japan . |
| 63-197919 | 8/1988 | Japan . |

(List continued on next page.)

OTHER PUBLICATIONS

Yang et al., "Field-induced textures of polymer-dispersed chiral liquid crystal microdroplets"; Liquid Crystals, 1991, vol. 9, No. 2, pp. 245-251.

Lin et al., "Ellectro-optic performance of a PDLC film utilizing dual frequency addressing", SPIE-Liqid Crystal Materials, Devices, and Applications; Feb. 1992, vol. 1665, pp. 13-19.

*Primary Examiner*—William L. Sikes
*Assistant Examiner*—Tai V. Duong
*Attorney, Agent, or Firm*—W. G. Fasse; W. F. Fasse

[57] ABSTRACT

A lighting system has a light source (2), a liquid crystal dimmer plate (4) for scattering a desired quantity of light from the light source (2), and a control power supply (5) for controlling a light scattering rate or effect of the liquid crystal dimmer plate (4). A light component transmitted through the liquid crystal dimmer plate (4) can be controlled by controlling the scattering effect of the dimmer plate (4). The so controlled light can be used as an illuminating light for a camera for example.

11 Claims, 28 Drawing Sheets

U.S. PATENT DOCUMENTS

| | | |
|---|---|---|
| 4,652,851 | 3/1987 | Lewin . |
| 4,693,557 | 9/1987 | Fergason . |
| 4,791,418 | 12/1988 | Kawakara et al. .......................... 359/48 |
| 4,818,070 | 4/1989 | Gunjima et al. ........................... 359/51 |
| 4,958,915 | 9/1990 | Okada et al. . |
| 5,023,603 | 6/1991 | Wakimoto et al. . |
| 5,023,758 | 6/1991 | Allen et al. ............................... 362/61 |
| 5,168,384 | 12/1992 | Genba ......................................... 359/83 |
| 5,184,117 | 2/1993 | Gauthier . |
| 5,307,185 | 4/1994 | Jones et al. . |
| 5,353,133 | 10/1994 | Bernkopf ................................... 359/51 |

FOREIGN PATENT DOCUMENTS

| | | |
|---|---|---|
| 63-253333 | 10/1988 | Japan . |
| 63-259516 | 10/1988 | Japan . |
| 64-25187 | 1/1989 | Japan . |
| 2099919 | 4/1990 | Japan . |
| 3293652 | 12/1991 | Japan . |
| 4-51219 | 2/1992 | Japan . |
| 5094153 | 4/1993 | Japan . |

FIG.12
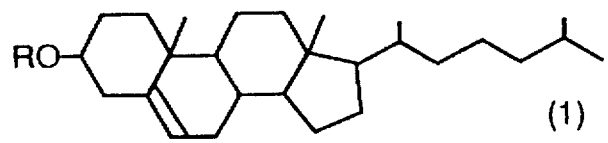
(1)
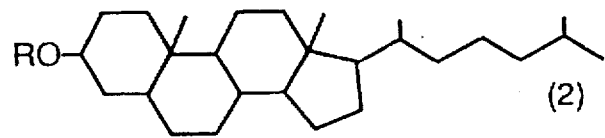
(2)
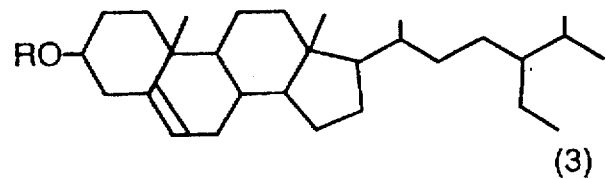
(3)
(R1)
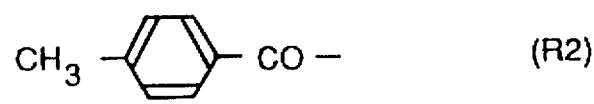
(R2)
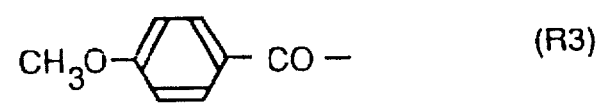
(R3)
(R4)

FIG.13
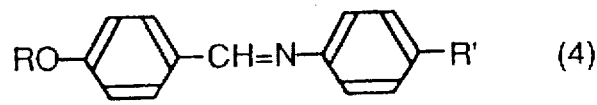 (4)
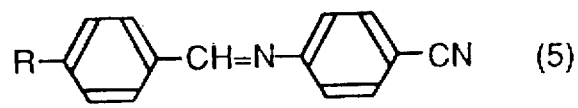 (5)
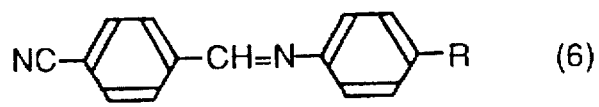 (6)
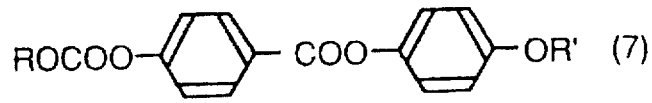 (7)
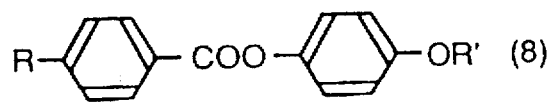 (8)
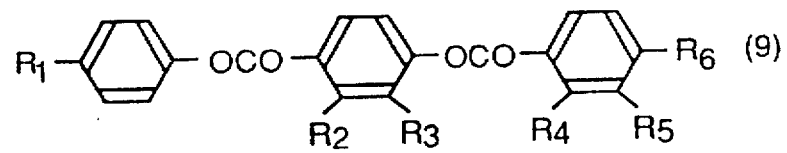 (9)
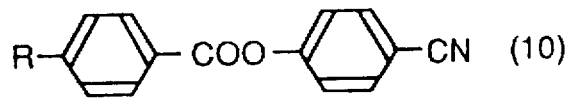 (10)

FIG.14
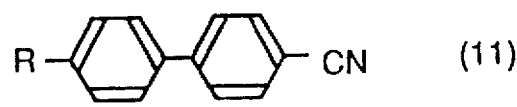 (11)
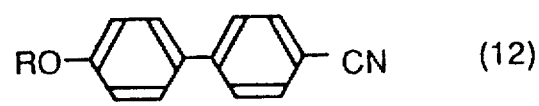 (12)
 (13)
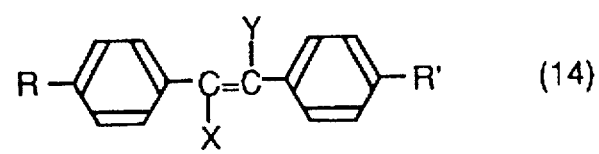 (14)
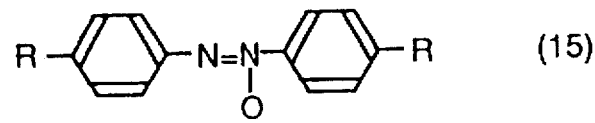 (15)
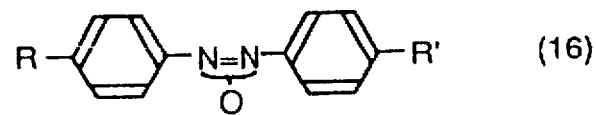 (16)

FIG.15
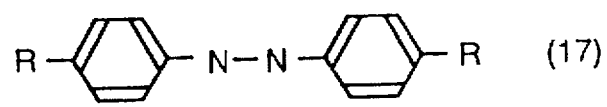 (17)
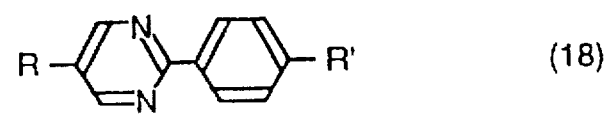 (18)
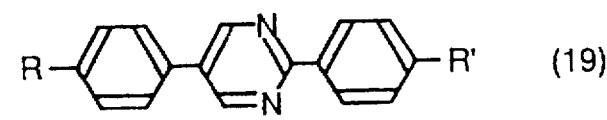 (19)
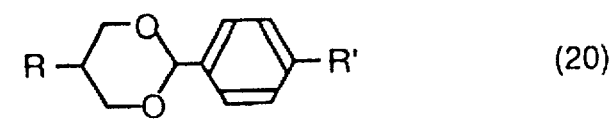 (20)
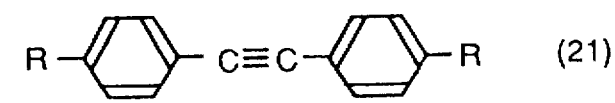 (21)
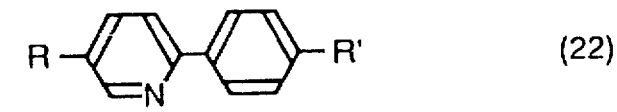 (22)

FIG.16
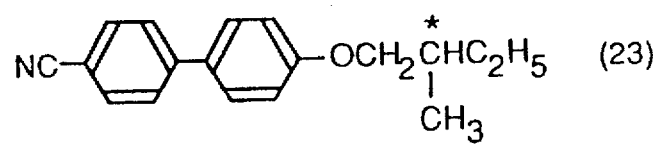  (23)
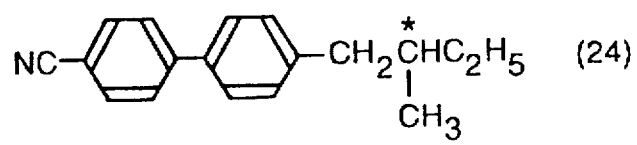  (24)
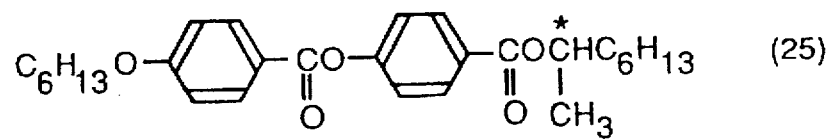  (25)
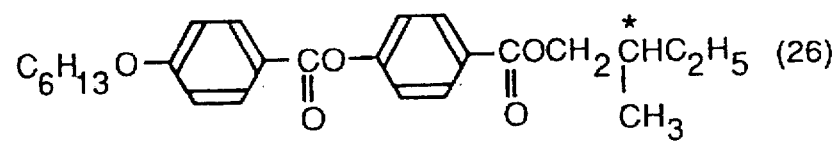  (26)
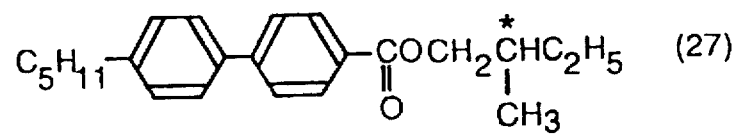  (27)

5,764,316

1

LIQUID CRYSTAL DIMMER PLATE AND LIGHTING SYSTEM INCLUDING THE SAME

FIELD OF THE INVENTION

The present invention relates to a lighting system including a liquid crystal dimmer plate, and more particularly, it relates to a lighting system employable for TV film shooting illumination, movie film shooting illumination, photo-taking illumination, production illumination or display illumination. In such illuminations it is necessary to continuously adjust the brightness of the illuminating light over a wide range for illuminating an object to be photographed by a camera.

BACKGROUND INFORMATION

Referring to FIG. 1, an example of a conventional lighting system capable of controlling the brightness is schematically illustrated. In the known lighting system, an incandescent lamp or a discharge lamp is employed as a light source 2 comprising a reflector 1. The light source 2 is connected to a power supply 3 through a lead wire 6. When an incandescent lamp is employed as the light source 2, the brightness of the illuminating light 13 emitted from the light source 2 is adjusted by controlling a voltage which is supplied from the power supply 3 to the light source 2.

Namely, the power supply 3 provided in the lighting system of FIG. 1 includes an electronic circuit such as an SCR. Therefore, the known lighting system tends to have an increased size and weight, with the added disadvantage of a large heating value. Further, the lighting system shown in FIG. 1 also has yet another disadvantage that the time required for changing the brightness is relatively long, since the speed of response is low.

When a discharge lamp such as a xenon lamp is employed as the light source 2, on the other hand, the voltage which is supplied from the power supply 3 is adjustable only in a voltage range exceeding an ON-state voltage required for maintaining a discharge, whereby the brightness of the discharge lamp can be adjusted only in a narrow range. Moreover, when the discharge lamp is supplied with a voltage which is different from an optimum discharge maintaining voltage, the life of the discharge lamp is reduced. Once the discharge lamp is turned off, a time of several seconds is required for lighting the same again FIG. 2 shows schematically another example of a conventional lighting system capable of adjusting the brightness. The lighting system shown in FIG. 2, which is similar to that shown in FIG. 1, includes a light damping plate 20. Light 12 which is emitted from the light source 2 passes through the light damping plate 20 to form illuminating light 13. In the lighting system shown in FIG. 2, a plurality of light damping plates 20 having different light absorption factors are selected to adjust the brightness of the illuminating light 13.

In the lighting system shown in FIG. 2, the brightness of the illuminating light 13 is adjusted through light absorption by the light damping plate 20, and hence the light damping plate 20 is readily deteriorated by heating. Therefore, no intense light source 2 can be employed and it is difficult to obtain a bright illuminating light 13. Further, the brightness of the illuminating light 13 cannot be continuously and quickly adjusted by selecting a plurality of light damping plates 20.

Referring to FIG. 3, still another example of a conventional lighting system is schematically illustrated. The lighting system shown in FIG. 3, which is similar to that shown in FIG. 1, comprises a blind including a plurality of shading strips 21, whereby the brightness of the illuminating light 13 is adjusted by changing the inclinations of the shading strips 21.

In the lighting system shown in FIG. 3, the inclinations of the shading strips 21 are mechanically changed so that it is difficult to quickly change the brightness of the illuminating light 13. Further, the brightness on a region to be illuminated can easily become nonuniform due to influences exerted by shadows of the shading strips 21. In addition, noises are caused by the mechanical position changes of the strips 21.

SUMMARY OF THE INVENTION

In consideration of the aforementioned related art, it is an object of the present invention to provide a lighting system which can continuously adjust the brightness of the illuminating light over a wide range at a high speed and which is excellent in durability. Another object is to provide a lighting system having a spectral distribution that remains constant even if the brightness is changed.

A lighting system according to one aspect of the present invention comprises a light source for emitting light, a liquid crystal dimmer plate for scattering a desired quantity of the light from the light source, and a control power supply for controlling a light scattering rate of the liquid crystal dimmer plate, and wherein the light from the light source, passing through the liquid crystal dimmer plate is not scattered when the light is employed as illuminating light.

A liquid crystal dimmer plate according to another aspect of the present invention includes two transparent electrodes, a transparent resin layer which is held between the transparent electrodes, and a liquid crystal dispersed in the resin layer, said liquid crystal including at least one of a nematic liquid crystal, a cholesteric liquid crystal and a smectic liquid crystal, and wherein the resin layer has a refractive index which is equivalent to an ordinary light refractive index of the Liquid crystal.

A liquid crystal dimmer plate according to still another aspect of the present invention comprises two transparent electrodes, a transparent support layer which is held between the transparent electrodes, and a liquid crystal material dispersed in the support layer and showing a cholesteric phase, wherein the cholesteric phase is formed by a chiral nematic liquid crystal which is prepared by adding a chiral component to a nematic liquid crystal while concentration of the chiral component is so adjusted that the light transmittance thereof in a shorter wavelength region is substantially identical to, or larger than the light transmittance in a longer wavelength region if a control voltage which is applied across the transparent electrodes is changed.

In a driving method for a liquid crystal dimmer plate according to still another aspect of the present invention, the waveform of a control voltage which is applied to the transparent electrodes for controlling the light transmittance of the liquid crystal dimmer plate, includes a period of an effective voltage which is lower than a prescribed threshold voltage in order to eliminate a hysteresis dependence of a liquid crystal on a change of the control voltage.

A liquid crystal dimmer plate according to a further aspect of the present invention comprises a composite layer containing a liquid crystal, and first and second transparent electrode Layers holding the composite layer, and each of the first and second transparent electrode layers includes at least one electrode pattern so that an area ratio of a region of the composite layer showing a light transmission state to that showing a light scattering state, can be adjusted by selecting an electrode pattern to which a driving voltage is applied.

BRIEF DESCRIPTION OF THE DRAWINGS

FIGS. 12 to 16 illustrate chemical formulas of various liquid crystal materials.

DESCRIPTION OF PREFERRED EMBODIMENTS

Figure 1:
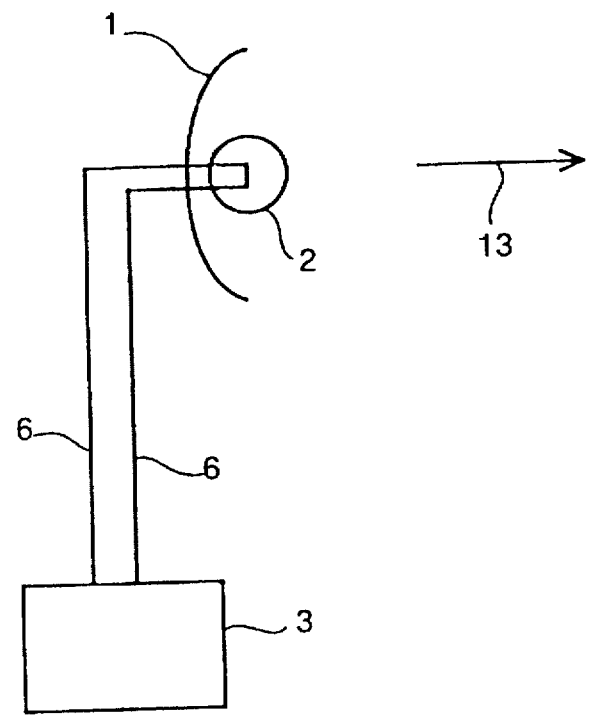
FIG. 1 is a schematic diagram showing an example of a conventional lighting system.
Figure 2:
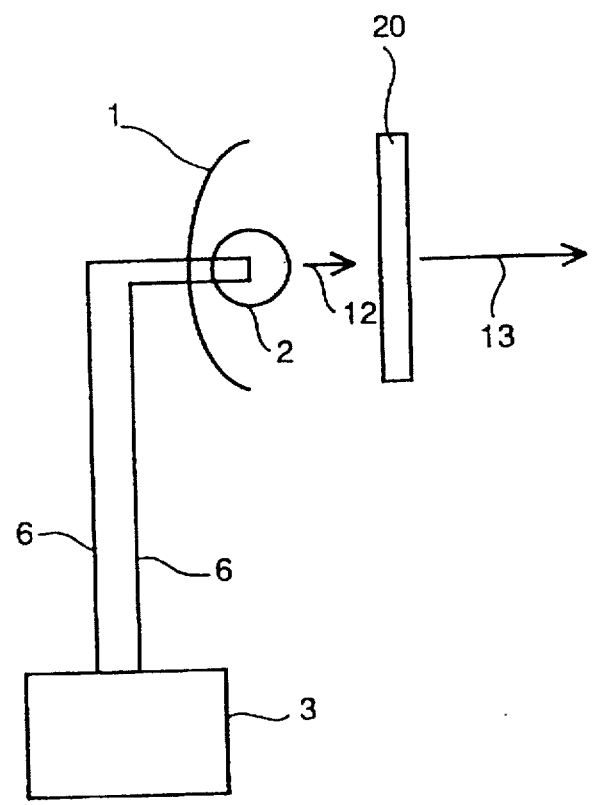
FIG. 2 is a schematic diagram showing another example of a conventional lighting system.
Figure 3:
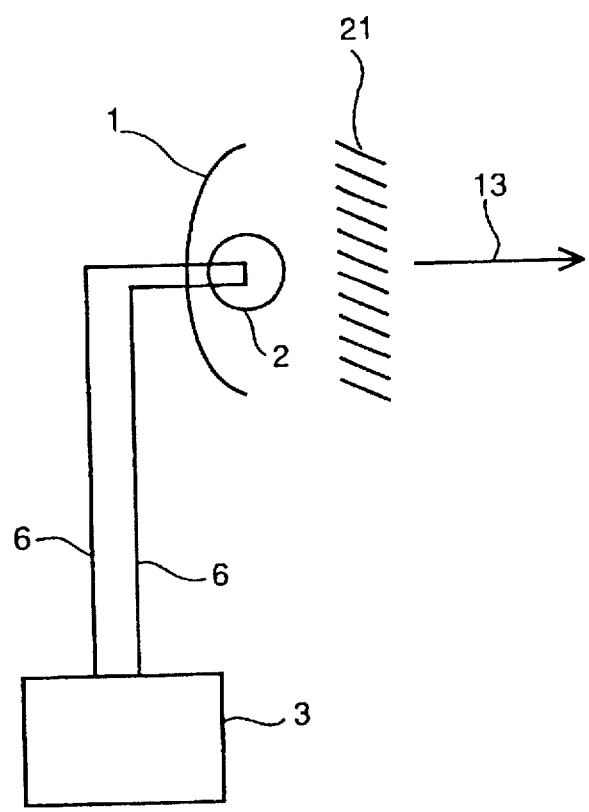
FIG. 3 is a schematic diagram showing still another example of a conventional lighting system.
Figure 4:
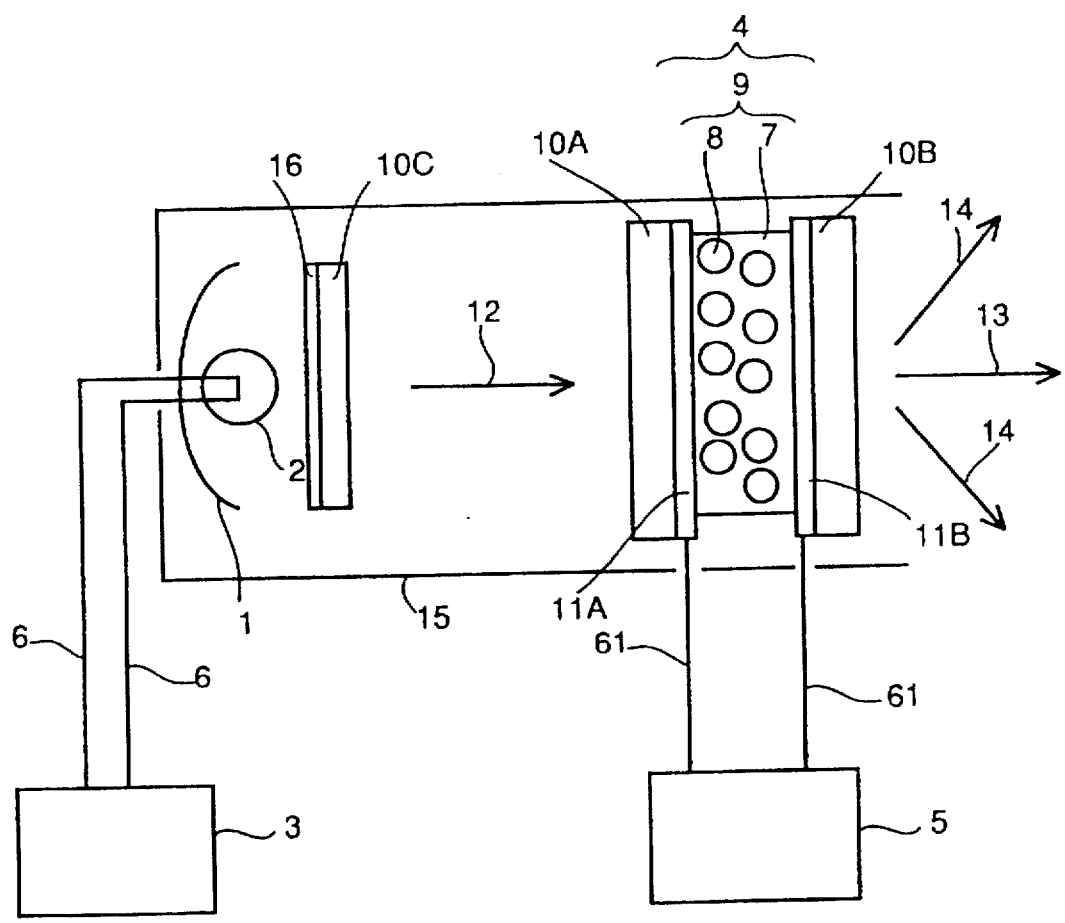
FIG. 4 is a schematic sectional view showing a lighting system according to an embodiment of the present invention.

The lighting system shown in FIG. 4 includes a light source 2 comprising a reflector 1; a light source power supply 3 which is connected to the light source 2 through a lead wire 6; a liquid crystal dimmer plate 4; and a liquid crystal dimmer plate ac power supply 5 for controlling the liquid crystal dimmer plate through lead wires 61. The liquid crystal dimmer plate 4 includes a composite layer 9 of transparent synthetic resin 7 and droplets of liquid crystals 8 dispersed therein. The composite layer 9 is held between transparent electrodes 11A and 11B. The transparent electrodes 11A and 11B are formed on transparent substrates 10A and 10B respectively, and connected to the liquid crystal dimmer plate ac power supply 5 through the lead wires 61.

Light 12 which is emitted from the light source 2 to enter the liquid crystal dimmer plate 4 is divided into straight illuminating light 13 and scattered light 14 by the composite layer 9. If desired, the light source 2 and the liquid crystal dimmer plate 4 may be stored in a cylindrical cover 15, to be shielded from light other than that in a direction parallel to the illuminating light 13.

An incandescent lamp such as a tungsten lamp or a halogen lamp, or a discharge lamp such as a xenon lamp, a metal halide lamp, a mercury lamp, a sodium lamp or a fluorescent lamp can be employed as the light source 2. However, it is preferable to employ a light source 2 having a structure for suppressing radiation of ultraviolet and infrared rays since ultraviolet rays are liable to deteriorate the composite layer 9 and infrared rays are liable to heat the liquid crystal dimmer plate 4. As to a light source 2 having large radiant quantities of ultraviolet and infrared rays, however, it is possible to eliminate the ultraviolet and infrared rays by arranging a transparent substrate 10C which is provided with a dielectric multilayer film 16 for reflecting the ultraviolet and/or infrared rays between the light source 2 and the liquid crystal dimmer plate 4, as shown in FIG. 4.

Figure 5:
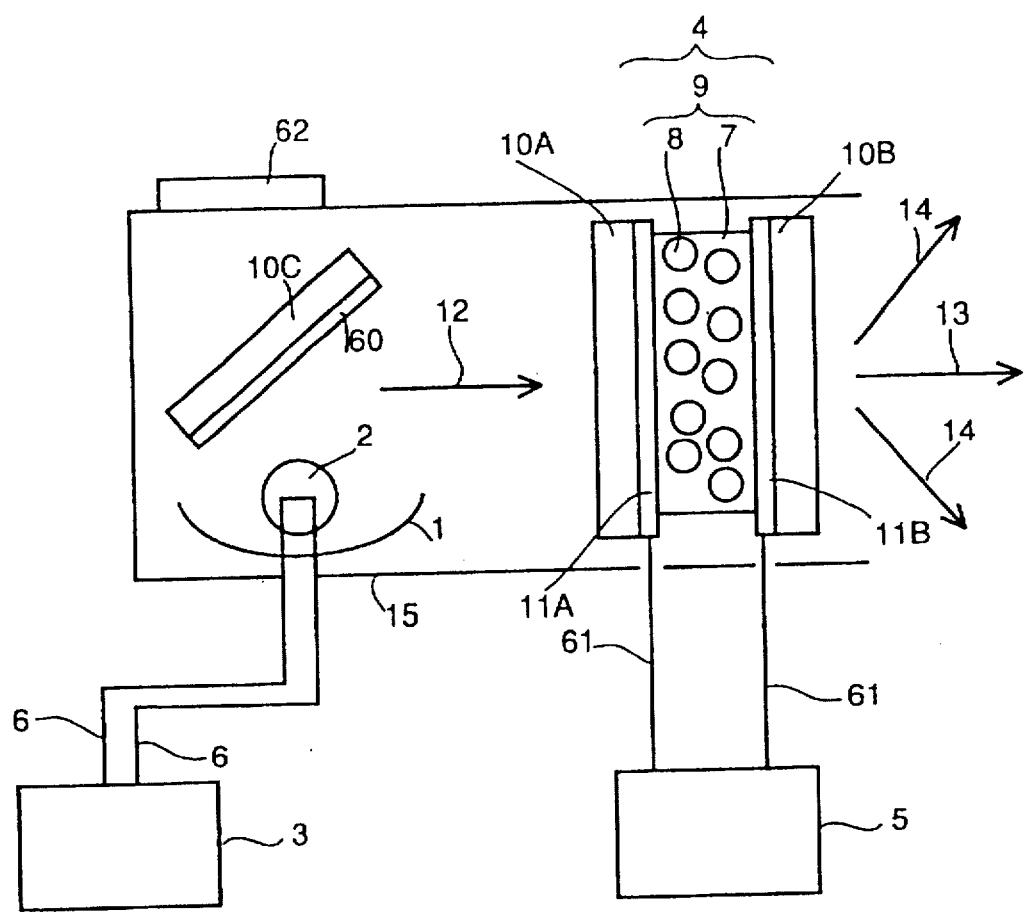
FIG. 5 is a schematic sectional view showing a lighting system according to another embodiment of the present invention.

Alternatively, a transparent substrate 10C which is provided with a dielectric multilayer film 60 for transmitting only ultraviolet and infrared rays may be arranged as shown in FIG. 5, in order to eliminate the ultraviolet and/or infrared rays. Namely, the dielectric film 60 reflects only visible light included in the light emitted from the light source 2 as incident light 12 upon the liquid crystal dimmer plate 4. In this case, it is possible to discharge heat generated by the ultraviolet and infrared rays which are transmitted through the dielectric multilayer film 60 to the exterior by providing a heat slinger 62 on a cylindrical cover 15, as shown in FIG. 5.

The liquid crystal dimmer plate ac power supply 5 for controlling the liquid crystal dimmer plate 4 is preferably at a frequency which is an integer times a frame frequency of a camera such as a TV camera or a film camera or equivalent thereto, in order to prevent flicker. If desired, it is possible to use a plurality of liquid crystal dimmer plates 4 in a superposed manner.

The composite layer 9 included in the liquid crystal dimmer plate 4 may be obtained by mixing a liquid crystal material and a resin material into a homogeneous mixed solution, and thereafter hardening only the resin component 7 by photohardening, thermohardening or reactive hardening to deposit or aggregate only liquid crystal droplets 8. Further, it is also possible to obtain the composite layer 9 by dissolving a liquid crystal material and a resin material in a common solvent and thereafter evaporating only the solvent component. When the composite layer 9 is prepared by such a method, the liquid crystal droplets 8 are reduced in size as the speed for hardening the resin 7 is increased. In order to scatter visible light components of various wavelengths as homogeneously as possible, the liquid crystal droplets 8 are preferably at least 0.5 μm in size. However, the quantity of light scattering is reduced if the sizes of the liquid droplets 8 are too large, and hence sizes of 0.5 to 10 μm are preferable in practice.

Figure 6:
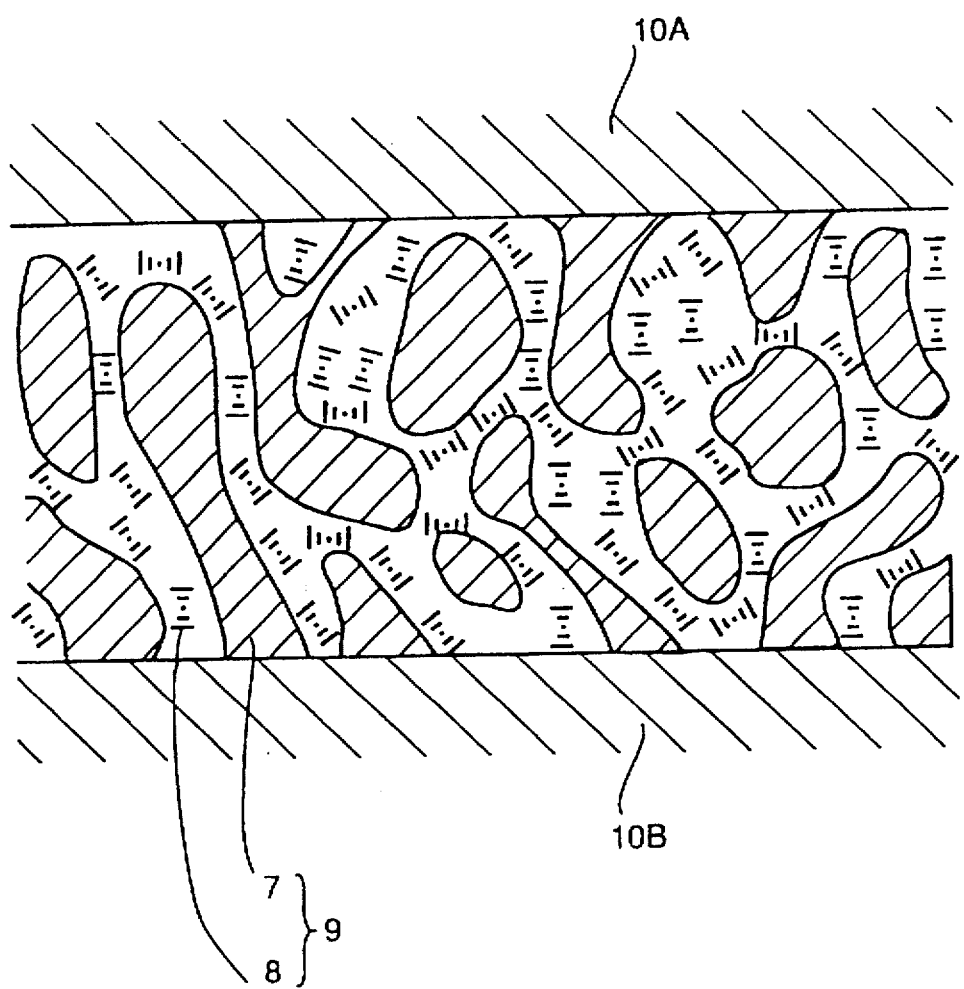
FIG. 6 is an enlarged sectional view of a composite layer containing liquid crystals.

When the liquid crystals 8 are in a large ratio to the resin 7, the liquid crystal droplets 8 may be so coupled with each other that the resin 7 has a spongy structure, as shown in FIG. 6. A composite layer 9 including such a spongy structure can also be obtained by impregnating a porous resin layer 7 with liquid crystals 8.

The composite layer 9 can be readily controlled in thickness due to its self-supporting property, whereby it is possible to manufacture a large-sized liquid crystal dimmer plate 4. When the resin 7 is soft, a spacer for surrounding an edge portion of the composite layer 9 may be provided between the transparent electrodes 11A and 11B, in order to further reliably support the edge portion of the composite layer 9. The composite layer 9 preferably has a thickness of at least 5 μm, which is sufficiently greater than the wavelengths of the visible light components, in order to attain sufficient light scattering. However, the thickness of the composite layer 9 is preferably not more than about 30 μm, since the maximum voltage required for controlling the liquid crystal dimmer plate 4 increases as the composite layer 9 is increased in thickness. If desirable for obtaining a color lighting system, the composite layer 9 may contain various well-known dichroic coloring matters.

The transparent electrodes 11A and 11B may be prepared from transparent conductive films of ITO (indium tin oxide) or $SnO_2$, which are formed on the transparent substrates 10A and 10B of glass or plastic films of polyethylene terephthalate (PET) or polyether sulfone (PES). Alternatively, the so-called transparent conductive glass or transparent conductive films which are applied to ordinary liquid crystal panels may be used for the present purposes.

In order to attain a high transmittance of the composite layer 9 in a light transmitting state, an ordinary light refractive index $n_o$ of the liquid crystals 8 is preferably at a value equivalent to a refractive index $n_p$ of the resin 7. On the other hand, a light scattering phenomenon in the composite layer 9 occurs on the basis of a difference between an extraordinary light refractive index $n_e$ of the liquid crystals 8 and the refractive index $n_p$ of the resin 7. Hence the refractive index anisotropy $\Delta n = n_e - n_o$ should preferably be as large as possible.

Therefore, the liquid crystals 8 can be prepared from nematic liquid crystals, cholesteric liquid crystals, smectic liquid crystals, or mixed liquid crystals thereof having a large refractive index anisotropy $\Delta n$. In view of a desired response speed, cyanoterphenyl or cyanobiphenyl type nematic liquid crystals are preferable. The resin 7 which is combined with such cyanoterphenyl or cyanobiphenyl type nematic liquid crystals 8 is preferably prepared from transparent acrylic resin, epoxy resin or urethane resin having a refractive index $n_p$ of about 1.52. In consideration of an influence by heat generated in the light source 2, the liquid crystals 8 and the resin 7 preferably have resistance against heat of at least 100° C.

Figure 7:
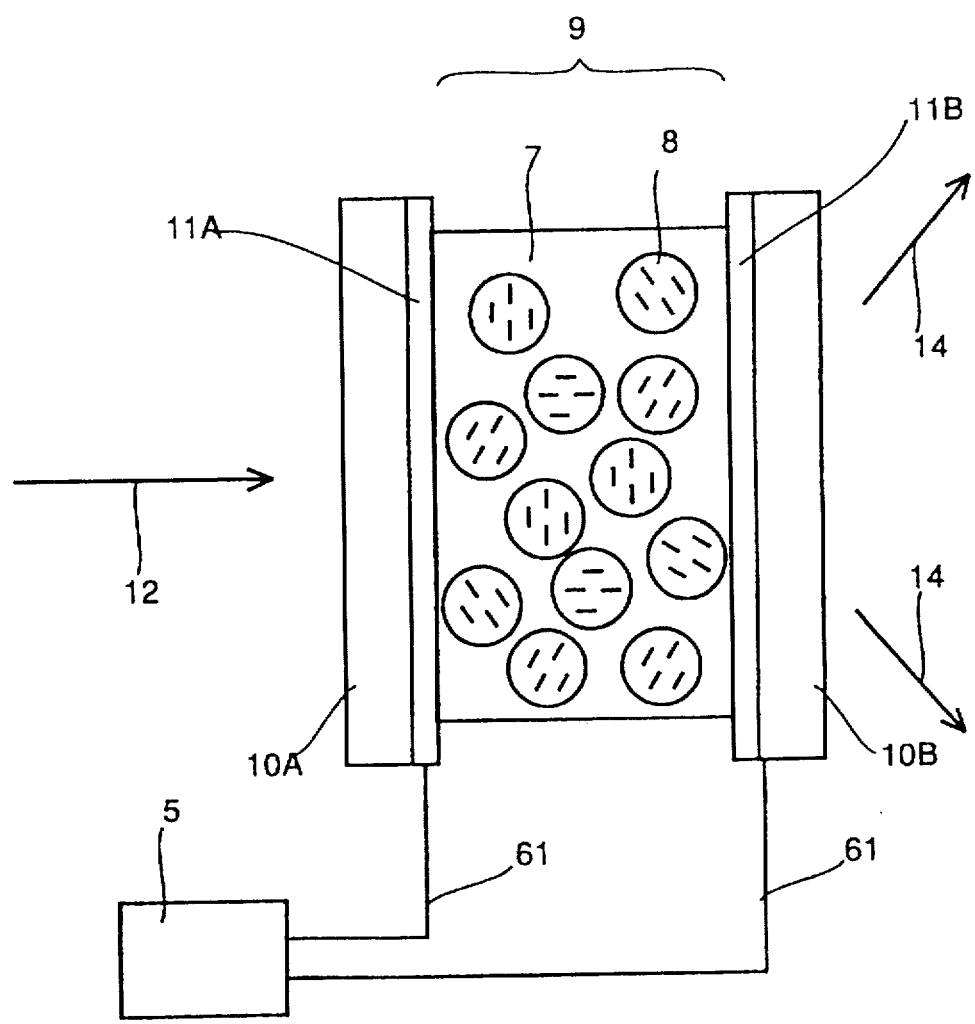
FIG. 7 is a diagram illustrating the operation of the liquid crystal dimmer plate shown in FIG. 4 in response to an applied low voltage.
Figure 8:
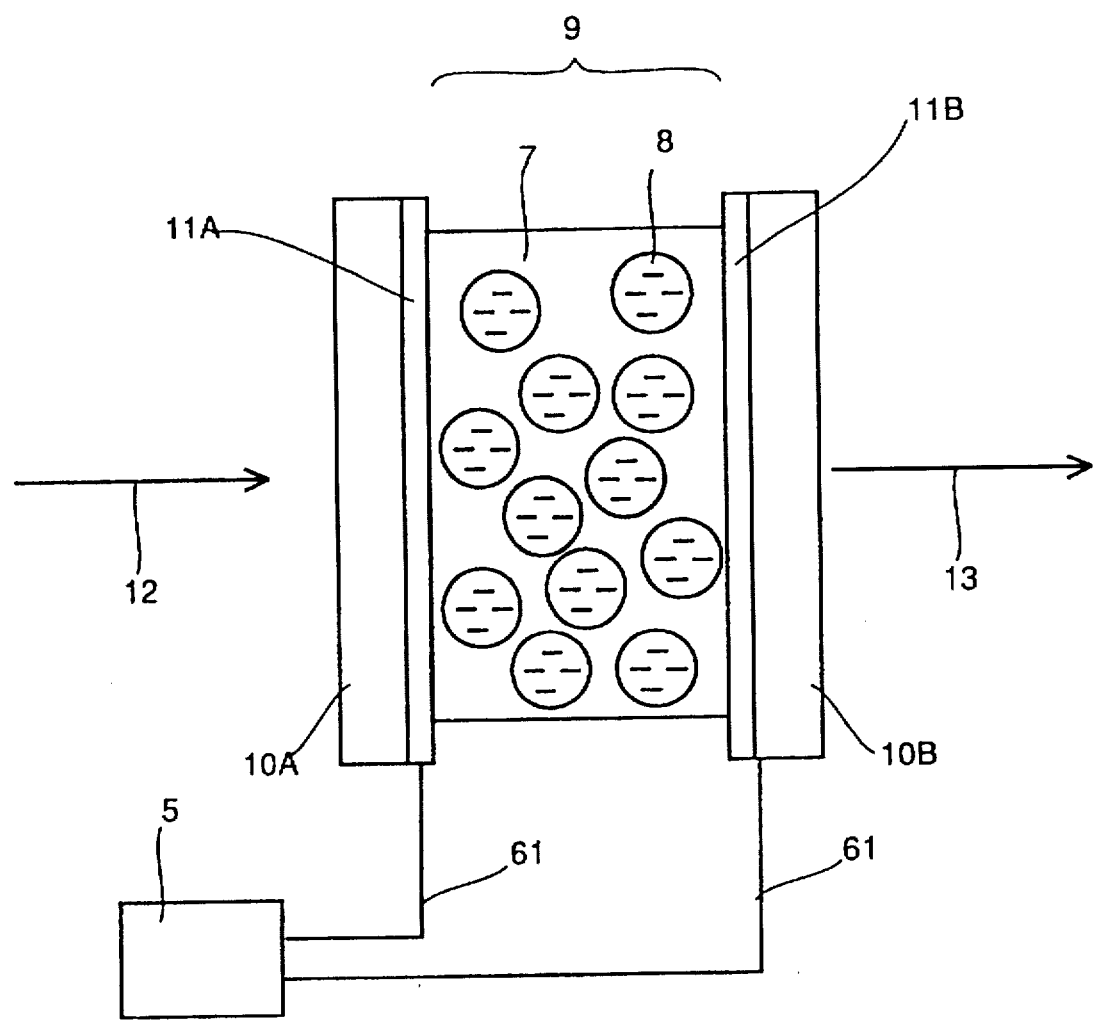
FIG. 8 is a diagram showing the operation of the liquid crystal dimmer plate shown in FIG. 4 in response to a sufficiently high applied voltage.

Referring also to FIGS. 7 and 8, an operation of the lighting unit shown in FIG. 4 is now described in more detail. The light source 2 shown in FIG. 4 is regularly supplied with an optimum voltage from the light source power supply 3. The non-polarized visible light 12 (wavelength: 380 nm, to 780 nm) emitted from the light source 2 is adjusted in brightness by the liquid crystal dimmer plate 4. Namely, when a voltage amplitude of the liquid crystal dimmer plate ac power supply 5 is zero or small, the liquid crystals 8 contained in the composite layer 9 are not driven by the voltage and hence the directions of arrangement or orientations of the liquid crystal molecules are in irregular states due to influences from interfaces between the same and the resin 7 as shown in FIG. 7. Due to mismatching of the extraordinary refractive index $n_e$ of the liquid crystals 8 and the refractive index $n_p$ of the resin 7, therefore, the incident light 12 is scattered on the interfaces between the resin 7 and the liquid crystals 8, to whiten the liquid crystal dimmer plate 4. Therefore, a substantial proportion or most of the incident light 12 is converted by the liquid crystal dimmer plate 4 to scattered light components 14 and the brightness of the illuminating light 13 is minimized.

On the other hand, when a sufficiently high ac voltage is supplied to the liquid crystal dimmer plate 4 from the liquid crystal dimmer plate power supply 5 as shown in FIG. 8, the liquid crystals 8 contained in the composite layer 9 have a positive dielectric constant anisotropy $\Delta\epsilon = \epsilon_\| - \epsilon_\perp > 0$, wherein $\epsilon_\|$ and $\epsilon_\perp$ represent dielectric constants of the liquid crystals in directions which are parallel and perpendicular to the molecular axes of the liquid crystals, respectively, whereby most of the liquid crystal molecules are arranged in parallel with an electric field direction. At this time, the ordinary light refractive index $n_o$ of the liquid crystals 8 approximates the refractive index $n_p$ of the resin 7, whereby a substantial proportion or most of the incident light 12 is transmitted through the liquid crystal dimmer plate 4 as such to form the illuminating light 13. In this state, the liquid crystal dimmer plate 4 is in a light transmission mode, and the brightness of the illuminating light 13 is maximized.

Since orientation changes of the liquid crystals 8 continuously take place following changes of the applied voltage, it is possible to continuously change the brightness of the illuminating light 13 by continuously changing the voltage of the liquid crystal dimmer plate power supply 5. Further, the liquid crystal dimmer plate 4 requires only a short response time of 1 to 30 milliseconds since the orientation changes of the liquid crystals 8 can quickly take place.

Figure 9:
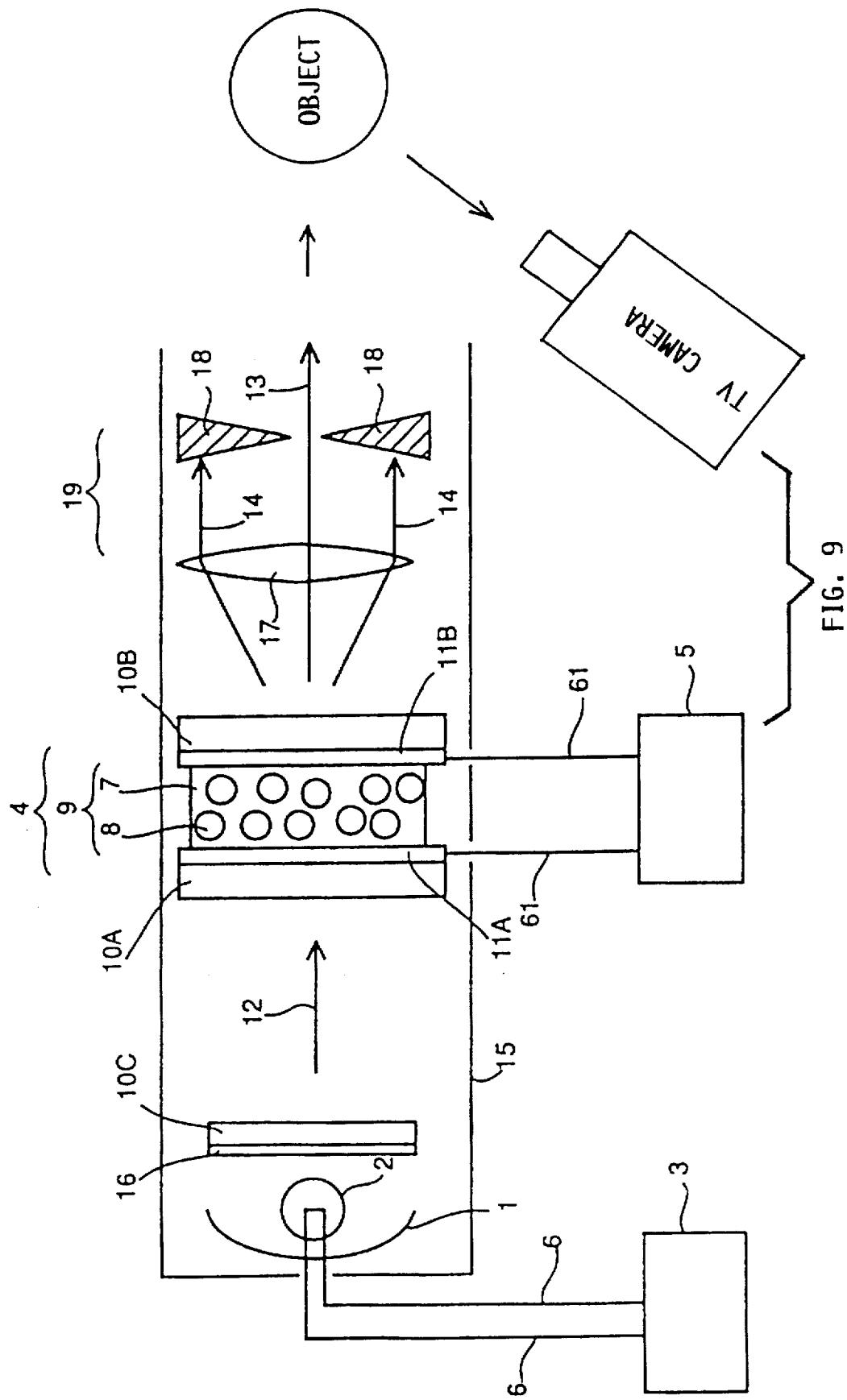
FIG. 9 is a schematic sectional view showing a lighting system according to still another embodiment of the present invention.

As shown in FIG. 9, further, it is possible to reliably eliminate only scattering light components 14 caused by the liquid crystal dimmer plate 4 by an optical selector 19 comprising an optical lens 17 and an optical diaphragm 18. In this case, it is possible to obtain a high modulated light ratio of at least 100:1 in relation to brightness levels of the incident light 12 and the illuminating light 13.

FIG. 9 also shows a camera such as a TV camera for photographing an object illuminated by the present lighting system.

In an actually prepared liquid crystal dimmer plate 4 of Example 1, cyanobiphenyl type mixed nematic liquid crystals (ordinary light refractive index $n_o$=1.525, extraordinary light refractive index $n_e$=1.754) were employed as the liquid crystals 8, while ultraviolet-setting urethane resin (refractive index $n_p$=1.524) was employed as the resin 7. A homogeneous mixed solution (compounding ratio: 1:1) of these liquid crystal and resin materials was irradiated with ultraviolet rays (wavelength: 365 nm) of 10 mW/cm$^2$ in intensity, thereby obtaining a composite layer 9 containing liquid crystal droplets 8 of about 1 to 3 μm. The transparent electrodes 11A and 11B were prepare from ITO formed on glass plates 10A and 10B respectively. The effective area and the thickness of the as formed liquid crystal dimmer plate 4 were 10 by 10 cm$^2$ and 10 μm respectively.

Figure 10:
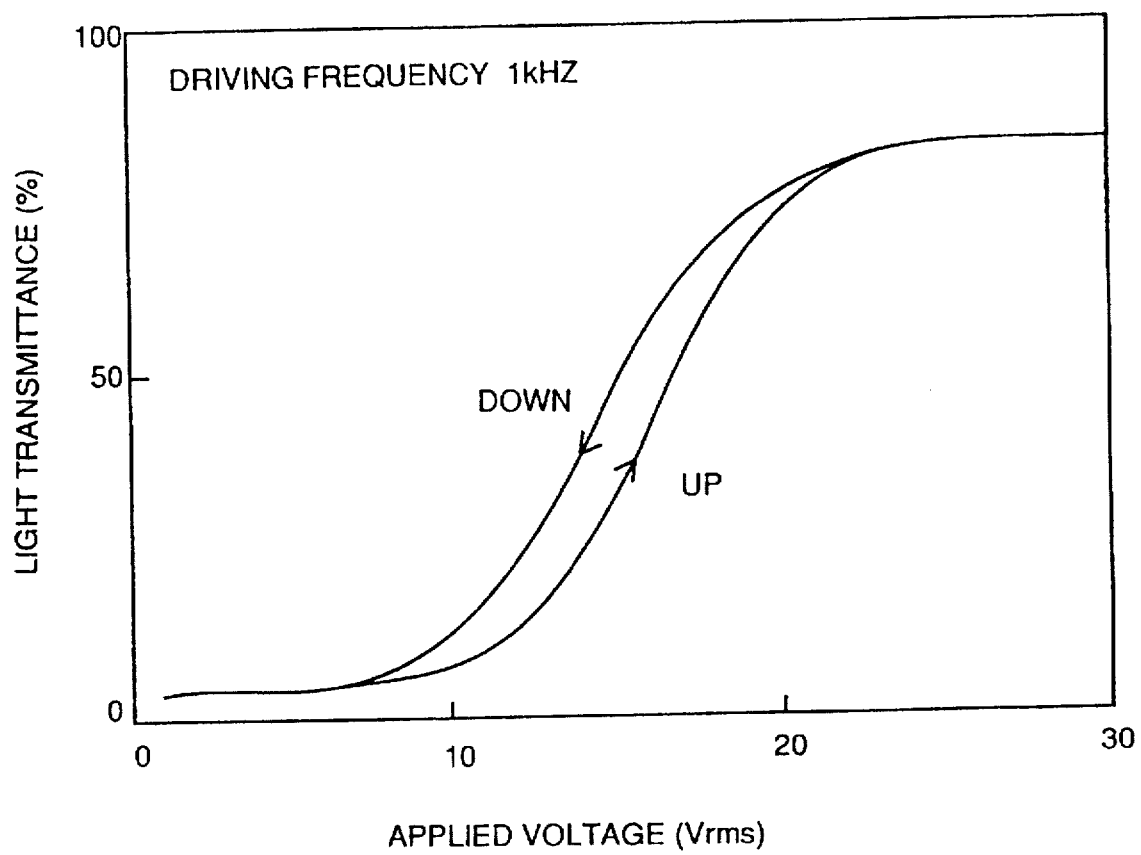
FIG. 10 is a diagram illustrating the relation between the voltage amplitude and the light transmittance of a liquid crystal dimmer plate in the embodiment of FIG. 9.

The graph of FIG. 10 shows the measured results of a relation between the light transmittance of the liquid crystal dimmer plate 4 and an applied voltage in a case of employing the liquid crystal dimmer plate 4 of Example 1 in the lighting system of FIG. 9. Namely, the abscissa represents an effective voltage (Vrms), and the ordinate represents the light transmittance (%). The maximum light transmittance was 80%. A response time of the liquid crystal dimmer plate 4 of Example 1 was several milliseconds.

Figure 11:
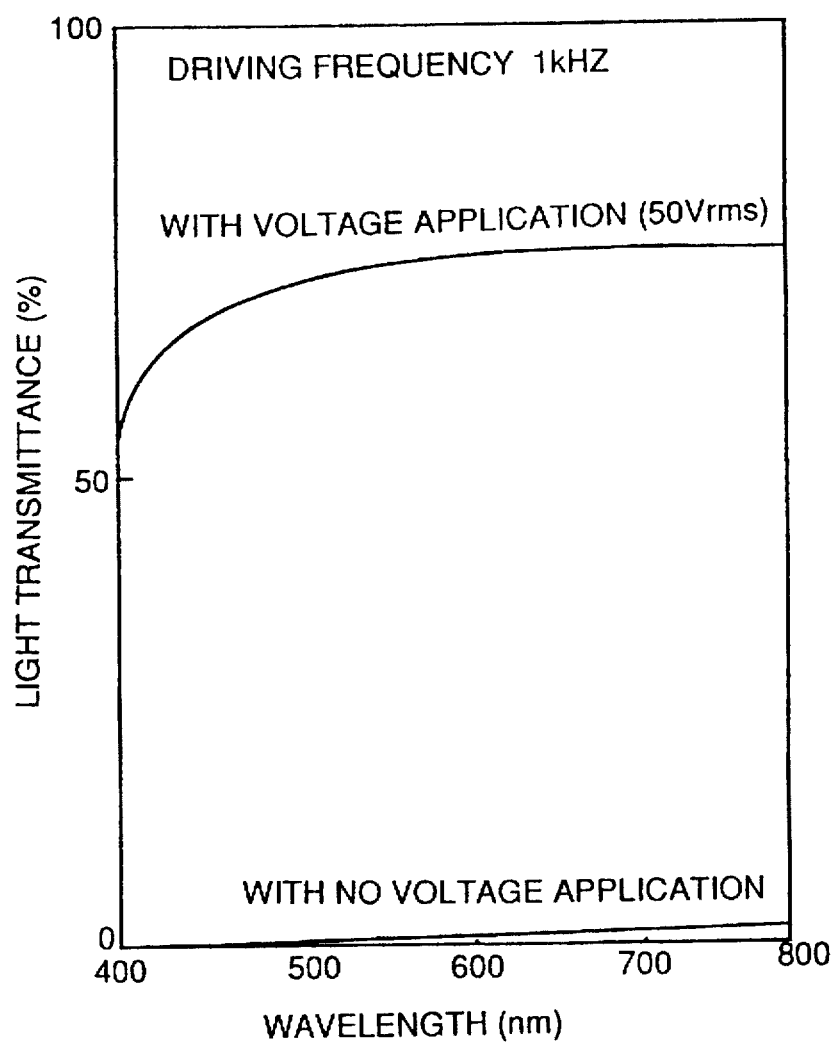
FIG. 11 is a diagram illustrating the relations between the light transmittance values of the liquid crystal dimmer plate and the wavelengths in the embodiment of FIG. 9.

Further, FIG. 11 shows the relations between light transmittance levels (%) of the liquid crystal dimmer plate 4 and of the wavelengths (nm) of incident light when no voltage was applied and when a sufficiently high voltage was applied. FIG. 11 shows that substantially flat light transmittance characteristics were obtained along the visible light regions in both cases and spectral components of the illuminating light 13 were substantially unchanged in the cases of applying a sufficiently high voltage to the liquid crystal dimmer plate 4 and applying no voltage thereto.

In the lighting system according to the aforementioned embodiment, the life of the light source 2 is increased since the light source 2 can be driven by an optimum voltage. The liquid crystal dimmer plate 4 is hard to heat and excellent in durability since the same absorbs no light. It is possible to obtain a bright illuminating light 13 since the strong light source 2 can be employed. Light transmittance of the liquid crystal dimmer plate 4 can be continuously adjusted by the applied voltage, so that the brightness of the illuminating light 13 can be continuously changed. The brightness of the illuminating light 13 can be adjusted in a wide range due to the wide range capable of controlling the transmittance of the liquid crystal dimmer plate 4. The response time of the liquid crystal dimmer plate 4 is as short as 1 to 30 milliseconds, since the liquid crystal dimmer plate 4 utilizes orientation changes of the liquid crystals. A lightweight and small light source power supply 3 can be employed since the light source 2 need only be supplied with an optimum constant voltage. The composite layer 9 can be homogeneously formed, whereby an illuminating light 13 having a homogeneous distribution of brightness can be obtained. Since the liquid crystal dimmer plate 4 is small in thickness and size and its peripheral shape is freely changeable, it is possible to assemble the light source 2, the liquid crystal dimmer plate 4, the lens 17 and the optical diaphragm 18 in a single cylindrical cover 15, thereby obtaining a compact lighting system which is excellent in portability.

A liquid crystal dimmer plate according to another embodiment of the present invention will now be described.

In the embodiment as described above, it is possible to control the spectrum of the slight illuminating light 13, which is transmitted through the liquid crystal dimmer plate 4 in opaque state wherein no voltage is applied to the plate 4, through the sizes and the distribution of the liquid crystal particles 8 dispersed in the resin layer 7, and by the optical properties of the resin material 7 and of the liquid crystal material 8. In a liquid crystal dimmer plate 4 prepared from nematic liquid crystals, however, it is impossible to control the spectrum of transmitted light 13 in a state wherein a voltage is applied to the dimmer plate 4. Particularly in an intermediate voltage range before the overall visible light region reaches a saturation transmittance, the spectrum of the transmitted light 13 fluctuates rather widely. More specifically, the transmittance at the same intermediate applied voltage varies with the wavelength. In particular, the transmittance of light of a longer wavelength range exceeds that of light of a shorter wavelength range. Therefore, the spectrum of the transmitted light 13 is relatively strengthened on the longer wavelength range, resulting in a change of the color tone of the transmitted light 13.

The cause therefore was investigated, to prove the following fact: While liquid crystal molecules are oriented in an electric field direction when a voltage is applied to a liquid crystal dimmer plate 4 which is prepared from a liquid crystal material showing a nematic phase, orientations of the liquid crystal molecules are held in the vicinity of interfaces between the liquid crystals 8 and the resin layer 7 since the strength of the electric field is insufficient in an intermediate voltage range before the overall visible light region reaches the saturation transmittance. Therefore, light of a shorter wavelength is mainly scattered in regions close to the interfaces, and the transmittance for shorter wavelength light is reduced below that for light of a longer wavelength.

Light of a certain wavelength is scattered at a degree which varies also with discontinues states of orientations of the liquid crystal molecules. Such discontinues states are present in regions of the liquid crystal having irregular orientation of the liquid crystal molecules and irregular states of the liquid crystal molecules. Such discontinues states of orientations depend on a force relation between the applied voltage and an interfacial action so that transmittance values for light components of respective wavelengths are differently varied with changes of the applied voltage, resulting in a change of the color tone of the transmitted light 13.

The inventors have made an investigation on the liquid crystal material 8 employed in the composite layer 9, to find that an influence exerted by interfacial action can be reduced by employing a liquid crystal material showing a cholesteric phase. In the cholesteric phase, a light scattering state with application of no voltage is caused not only by interfacial action but a selective scattering effect and a selective reflection effect depending on chiral pitches and occurrence of defective portions caused by mismatching in the structural arrangement of liquid crystal molecules. Further, it is conceivable that wavelength bands of light components scattered by respective phenomenons are different from each other while electric field values for eliminating scattered states caused by the respective phenomenons are also different from each other. When a fluctuation in the transmittance caused by interfacial action is canceled by controlling various factors such as a selective scattering effect other than the interfacial action, it is possible to freely set a spectral distribution of the transmitted light 13, thereby obtaining a liquid crystal dimmer plate 4 in which the color tone of the transmitted light 13 is not varied with the applied voltage.

Specifically, in the liquid crystal dimmer plate 4 according to this embodiment, a liquid crystal material 8 having a cholesteric phase is employed and the dependence of a spectrum of light 13 transmitted through a composite layer 9 on the applied voltage, is so controlled that the transmittance of light of a shorter wavelength band is at about the same as or larger than the transmittance of light of a longer wavelength band in an intermediate applied voltage range before the overall visible light region reaches a saturation transmittance.

In order to control the spectral distribution of the light 13 transmitted through the composite layer 9, it may be conceivable to adjust the elasticity, an average refractive index and a refractive index anisotropy of the liquid crystal material 8, or to adjust the property of the resin layer 7, the distributed state of the liquid crystals 8 and the thickness of the composite layer 9. Particularly preferable is a method of employing chiral nematic liquid crystals obtained by adding a chiral component to a liquid crystal material having a nematic phase as the liquid crystal material 8 having a cholesteric phase and adjusting the concentration of the chiral component in the liquid crystal material 8 for changing the chiral arrangement of the liquid crystal molecules. According to this method, it is possible to control the spectral distribution of the light 13 transmitted through the composite layer 9 by simply adjusting the amount of addition of the chiral component.

As hereinabove described, the composite layer 9 having a spongy structure shown in FIG. 6 can be formed by applying a mixed solution prepared by dissolving or dispersing a transparent high polymer material and a liquid crystal material in a proper solvent on one transparent electrode 11A and thereafter evaporating the solvent for phase-separating the high polymer material 7 and the liquid crystal material 8 from each other. Another transparent electrode 11B is superposed on the surface of the as-formed composite layer 9.

On the other hand, the composite layer 9 having such a structure that the liquid crystal particles 8 are dispersed in the resin layer 7 can be formed by a suspension method or a polymerization phase separation method. In the suspension method, a composite layer 9 comprising a high polymer layer 7 and liquid crystal particles 8 dispersed therein is obtained by applying a milky solution prepared by mixing a hydrophilic high polymer material such as polyvinyl alcohol with a liquid crystal material, to one transparent electrode 11A and thereafter evaporating water contained in the solution. Another transparent electrode 11B is superposed on the surface of the as-formed composite layer 9.

In the polymerization phase separation method, a solution prepared by mixing a prepolymer, a liquid crystal material and a polymerization initiator with each other is injected between two transparent electrodes 11A and 11B; to cause a polymerization reaction and a bridging reaction by ultraviolet rays or heat, thereby forming a composite layer 9 containing a liquid crystal material 8 dispersed in the form of particles in a high polymer material 8.

While a well known cholesteric liquid crystal material such as a cholesterol compound expressed in a general formula (1) in FIG. 12, a cholestanol compound expressed in a general formula (2) or a β-sitosterol compound expressed in a general formula (3) can be employed as the liquid crystal material contained in the composite layer 9, mixed liquid crystals prepared by adding a chiral component to a well-known liquid crystal material showing a nematic phase can be preferably employed. Referring to the general formulas (1) to (3), the symbol R-O represents any of the formulas R1 to R4 in FIG. 12.

An azomethyl compound expressed in any of general formulas (4) to (6) in FIG. 13, an ester compound expressed in any of general formulas (7) to (10), a biphenyl compound or a terphenyl compound expressed in any of general formulas (11) to (13) in FIG. 14, a stilbene compound expressed in a general formula (14), an azoxy compound expressed in a general formula (15) or (16), or an azo compound expressed in a general formula (17) in FIG. 15 can be employed as a liquid crystal material showing a nematic phase. Further, a pyrimidine compound such as that expressed in a general formula (18) or (19) in FIG. 15, a dioxane compound such as that expressed in a general formula (20), a tolane compound such as that expressed in a general formula (21), or a pyridine compound such as that expressed in a general formula (22) is also usable for the present purposes.

Symbols R, R', $R_1$ to $R_6$, X and Y in the formulas (4) to (22) represent substitutional groups such as $-C_nHC_{2n+1}-$ $OC_nH_{2n+1}$, a halogen atom, $-CN$, $-OCF_3$, $-CF_3$ and the like.

A chiral component which is added to the aforementioned liquid crystal material may be prepared not only from well-known chiralic molecules forming a compound expressed in any of formulas (23) to (27) in FIG. 16 but from one of the various cholesteric liquid materials as described above. The symbol ₢ appearing in the formulas (23) to (27) represents asymmetric carbon atoms.

Concentration of the chiral component contained in the liquid crystal material 8 can be determined in response to conditions such as the type of the chiral component, the type of the liquid crystal material having a nematic phase, the structure of the composite layer 9 and the environment wherein the liquid crystal dimmer plate 4 is to be used. For example, concentration of the chiral component, can be determined within a range capable of controlling the dependence of the spectrum of the light 13 transmitted through the composite layer 9 without being scattered, on the applied voltage so that the transmittance of light of a shorter wavelength band is substantially at the same as or larger than that of light of a longer wavelength band.

The liquid crystal material 8 preferably has a large refractive index anisotropy $\Delta n$ and a large dielectric constant anisotropy $\Delta \epsilon$. The high polymer material forming the resin layer 7 preferably has a high transparency with respect to visible light, so that a (meth)acrylic type high polymer represented by PMMA, epoxy resin, urethane resin or the like can be preferably employed, for example. A transparent porous inorganic material such as glass can be employed in place of the resin layer 7.

The liquid crystal dimmer plate according to this embodiment exhibits a hysteresis in the relation between the applied voltage and the light transmittance, such that the applied voltage and the transmittance are not in a one-to-one correspondence to each other. This is because the hysteresis dependence takes place in the liquid crystal molecules 8 in the composite layer 9 while the voltage is applied across the transparent electrodes 11A and 11B, to cause a difference in voltage responsiveness of the liquid crystal molecules between times of increasing and reducing the applied voltage.

This hysteresis causes no inconvenience with respect to driving of the liquid crystal dimmer plate 4 when the voltage control conditions are set with due regard to the characteristics of the dimmer plate 4. However, the hysteresis dependence of the liquid crystal molecules disappears in a period when an effective voltage value of the applied voltage is held at a level lower than a threshold voltage, whereby it is possible to bring the applied voltage and the transmittance into a one-to-one correspondence to each other and the liquid crystal dimmer plate 4 can be further readily driven without any requirement for setting of complicated voltage control conditions.

Figure 17A:
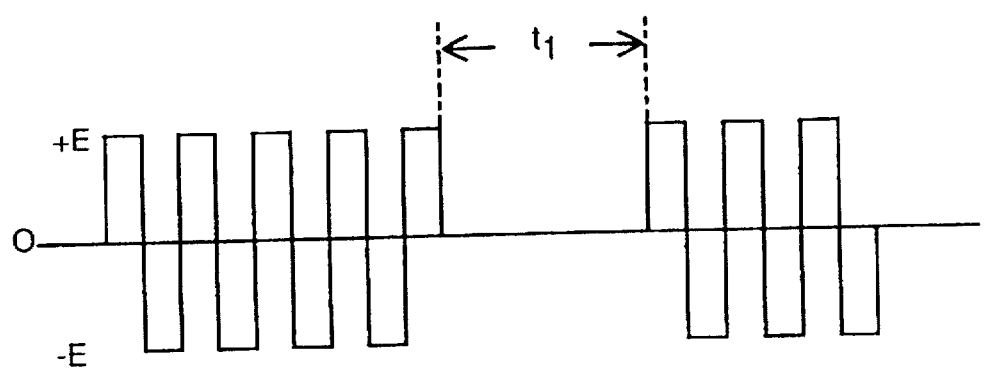
FIG. 17A is a waveform diagram showing an example of an applied voltage in a driving method for a liquid crystal dimmer plate according to the present invention.
Figure 17B:
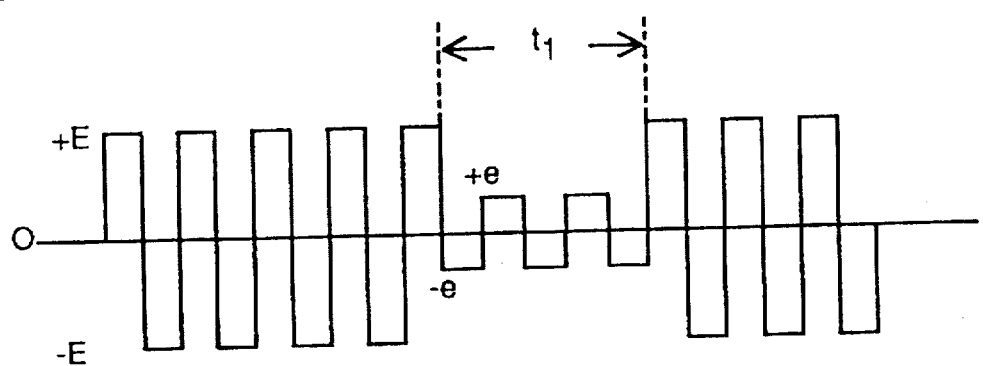
FIG. 17B is a waveform diagram showing another example.
Figure 18:
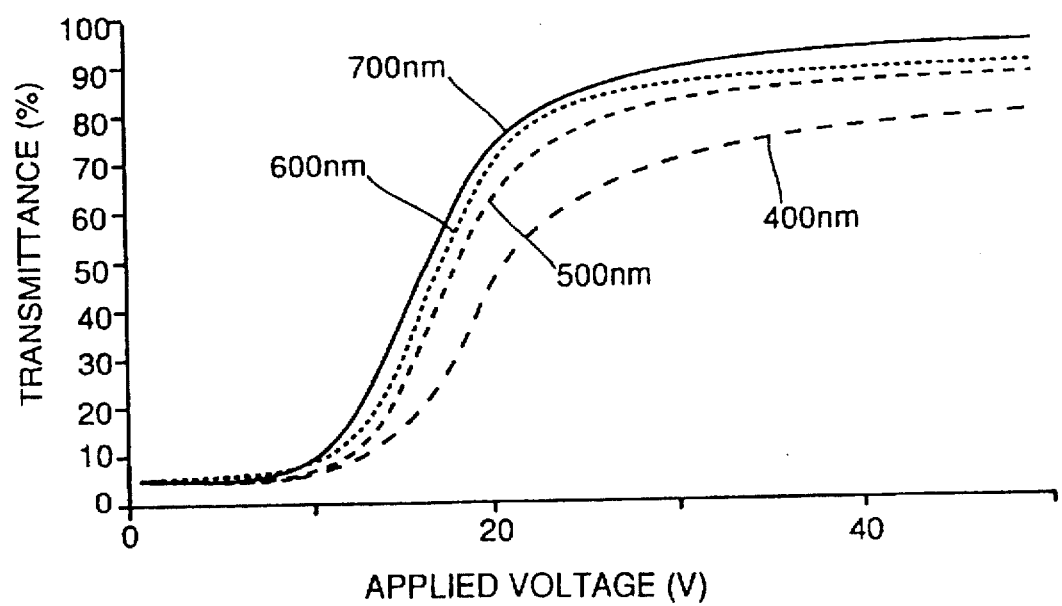
FIG. 18 is a graph illustrating the relations between the applied voltages and transmittance values for light of various wavelengths in a liquid crystal dimmer plate according to Example 2.
Figure 19:
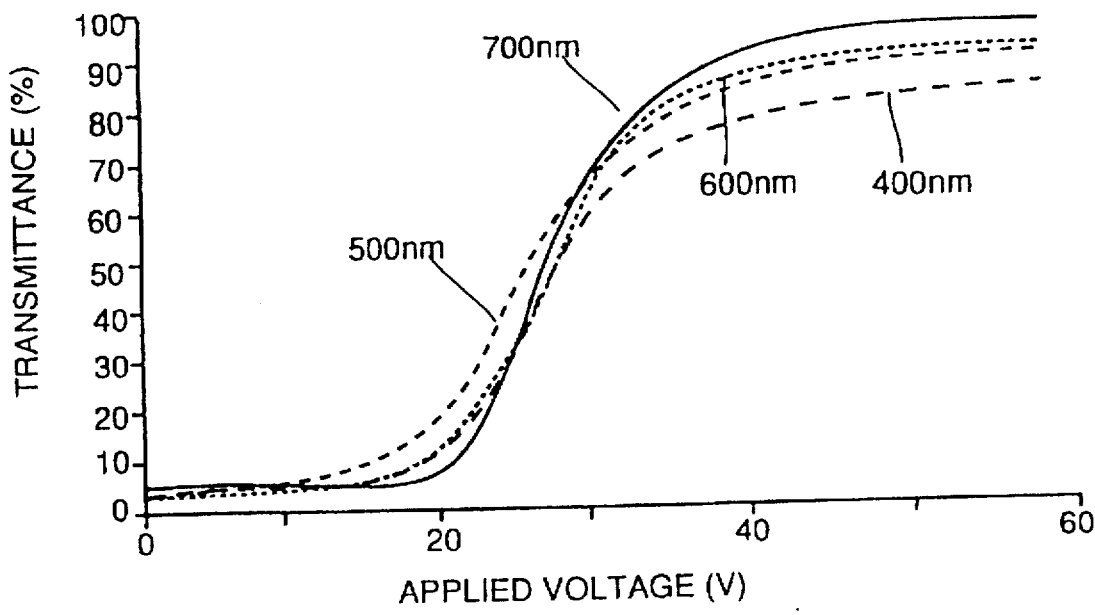
FIG. 19 is a graph illustrating the relations between the applied voltages and transmittance levels for light of various wavelengths in a liquid crystal dimmer plate according to Example 3.
Figure 20:
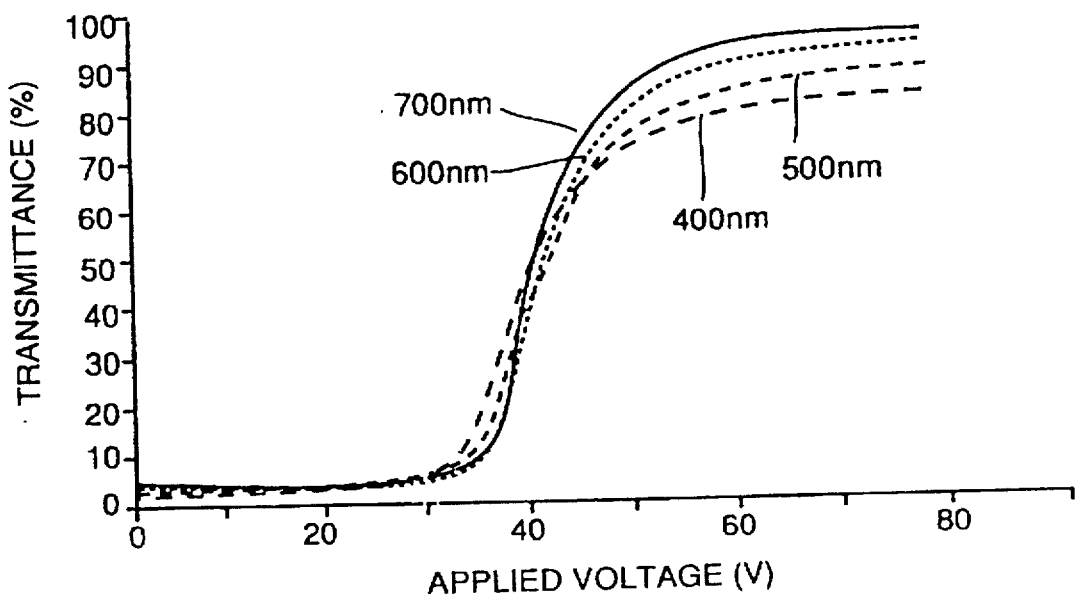
FIG. 20 is a graph illustrating the relations between the applied voltages and transmittance levels for light of various wavelengths in a liquid crystal dimmer plate according to Example 4.
Figure 21:
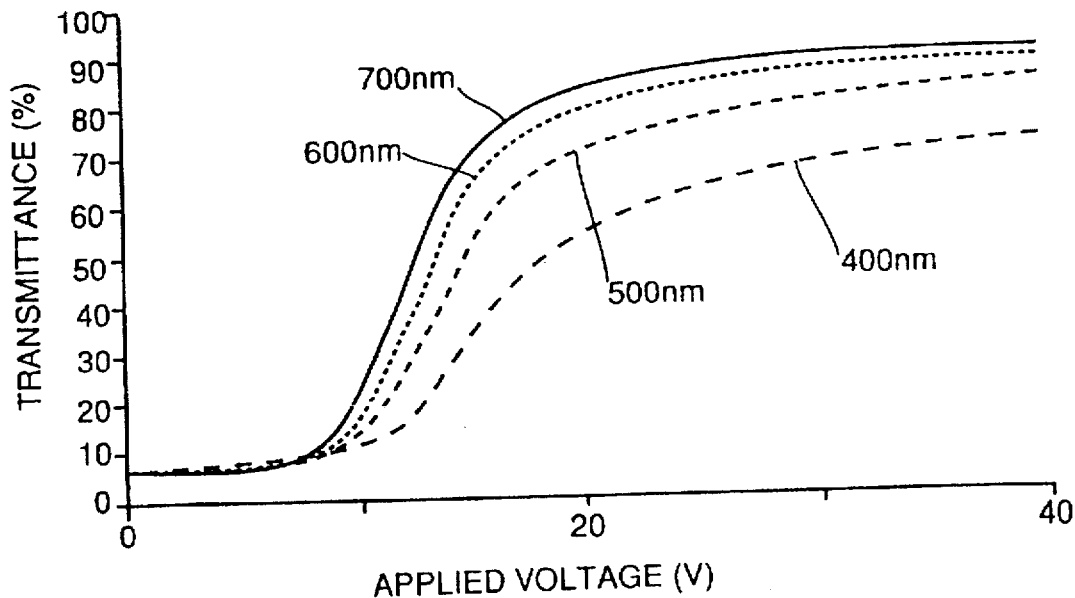
FIG. 21 is a graph illustrating the relations between the applied voltages and transmittance levels for light of various wavelengths in a liquid crystal dimmer plate according to Comparative Example 1.

More specifically, a component of a zero voltage is included in an applied voltage waveform, a rectangular wave in this case, by a time $t_1$ as shown in FIG. 17A, or an effective voltage which is lower than a threshold voltage during the time $t_1$ is applied across the transparent electrodes 11A and 11B of the liquid crystal dimmer plate 9 as shown in FIG. 17B, for example. The threshold voltage is held at such a level that a change in the light transmittance of the composite layer 9 is abruptly started when the applied voltage across the transparent electrodes 11A and 11B is gradually increased from 0 V. However, the transmittance of the composite layer 9 is slightly changed also by a change of the applied voltage below this threshold voltage, and hence it is also possible to define the threshold voltage by an effective voltage for bringing the transmittance of the composite layer 9 to 10% when the applied voltage is gradually reduced from a sufficiently high level, for example.

If the time $t_1$ in FIG. 17A or 17B is too long, a reduction in the transmittance of the composite layer 9 may be recognized as a flicker, while a hysteresis dependence of the liquid crystal molecules may not be sufficiently relieved but the hysteresis property may be left if the time $t_1$ is too short. Therefore, the time $t_1$ is preferably in a range of about 0.5 to 50 milliseconds. The period of the time $t_1$ may be repeatedly inserted in the voltage waveform at constant time spaces, or a circuit may be provided for automatically inserting such a period in a case of changing the control voltage.

Specific Examples according to this embodiment will now be described. A nematic liquid crystal material (product No. E63 by Merck Japan Limited) and a chiral component (product No. CB15 by Merch Limited Great Britain) were mixed with each other in compounding ratios shown in Table 1, to prepare chiral nematic liquid crystal materials. 75 parts by weight of each chiral nematic liquid crystal material and 25 parts by weight of an acrylic type high polymer (product No. SG790DR by TEIKOKU CHEMICAL INDUSTRIES Co., Ltd.) were so dissolved in a solvent of dichloromethane that the solute concentration was 20%.

TABLE 1

| | Compounding of Components (part by weight) | |
|---|---|---|
| | Nematic Liquid Crystal Material | Chiral Component |
| Example 2 | 95 | 5 |
| Example 3 | 90 | 10 |
| Example 4 | 85 | 15 |
| Comparative Example 1 | 100 | 0 |

Each mixed solution was applied onto a transparent conductive film 11A which was formed on a glass substrate 10 by bar coating, and the solvent was evaporated in air at 1 atm. and 25° C., to form a composite layer 9 having a thickness of 18 μm. A transparent conductive film 11B which was formed on a glass substrate 10B was superposed on this composite layer 9 and pressed with a pressure of about 1 kgf/cm$^2$ to be brought into close contact with the composite layer, thereby forming a liquid crystal dimmer plate 4. Further, a liquid crystal dimmer plate of Comparative Example 1 containing no chiral component was prepared similarly to Examples 2 to 4.

A rectangular wave voltage of 200 Hz was applied across the transparent electrodes 11A and 11B of each of the liquid crystal dimmer plates according to Examples 2 to 4 and Comparative Example 1, to measure the relations between transmittance values for light components of 400 nm, 500 nm, 600 nm and 700 nm in wavelength and applied voltages with a spectrophotometer (type No. UV-160 by Shimadzu Corporation). At this time, the applied voltages were raised stepwise from 0 V in 2 V increments.

FIGS. 18, 19, 20 and 21 illustrate the results of the measurement in relation to Examples 2, 3 and 4 and Comparative Example 1, respectively. In each of these figures, the ordinate shows values obtained by standardizing transmittance levels of the glass substrates to 100%, while voltage values on the abscissa show voltage peak values of the rectangular wave voltages. From the measured results shown in these figures, it has been recognized that a color tone change caused by a change of the applied voltage can be substantially suppressed by properly adjusting the concentration of the chiral component contained in the liquid crystal material so transmittance for light of a shorter wavelength range is so increased as to attain an approximate voltage dependence of transmittance values related to light components of the respective wavelengths.

Figure 22:
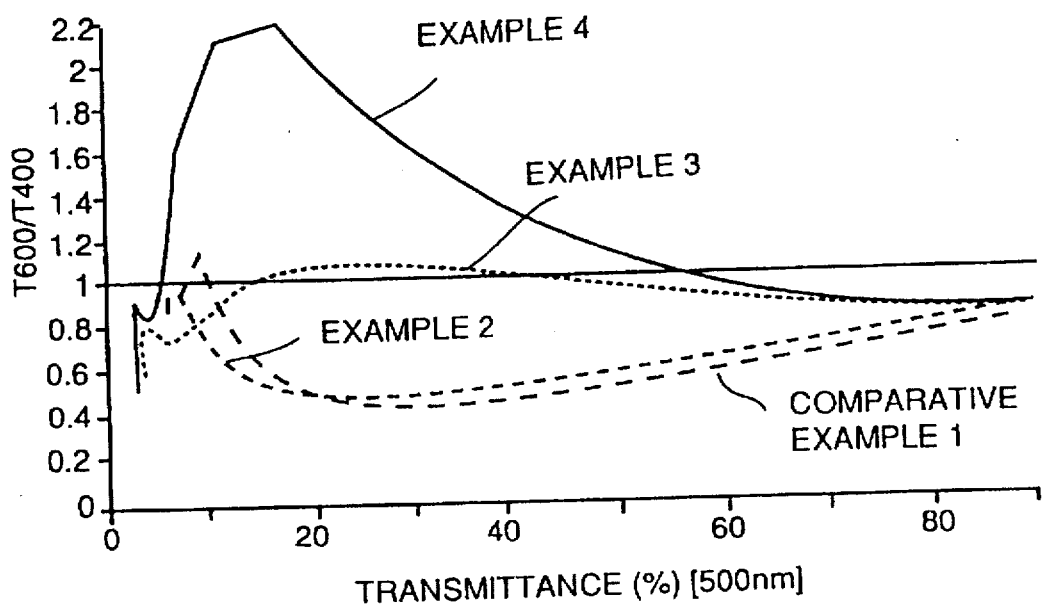
FIG. 22 is a graph illustrating the relations between the transmittance levels and color tones of transmitted light in liquid crystal dimmer plates according to Examples 2 to 4 and a Comparative Example 1.

In order to further clarify the aforementioned fact ratios $t_{400}/t_{600}$ of transmittance values $t_{400}$ for light of a wavelength of 400 nm to transmittance values $t_{600}$ for light of a wavelength of 600 nm were calculated in FIGS. 18, 19, 20 and 21, to obtain relations between the ratios $t_{400}/t_{600}$ and transmittance values for light of a wavelength of 500 nm. FIG. 22 shows the results which indicate that there is no color tone change between transmitted light components of the aforementioned two wavelengths if $t_{400}/t_{600}=1$. On the other hand, it means that blue is intensified in the transmitted light as $t_{400}/t_{600}$ is increased beyond 1 (i.e., the transmittance for light of a wavelength of 400 nm is large) while red is intensified in transmitted light as $t_{400}/t_{600}$ is reduced below 1 (i.e., transmittance for light of a wavelength of 600 nm is large). In other words, it has been recognized that the transmitted light was regularly colored red in Comparative Example I containing no chiral component, and Example 2 containing the chiral component in a small amount exhibited a similar result. However, it was recognized that the transmitted light was regularly white in Example 3 while that in Example 4 was blue.

Figure 23A:
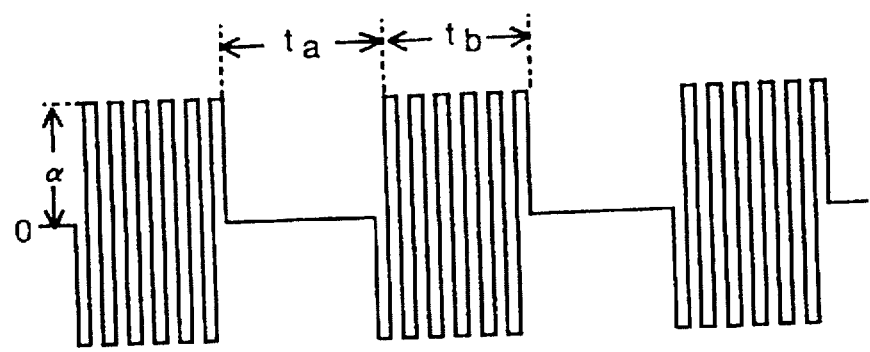
FIG. 23A is a waveform diagram showing a specific example of an applied voltage in a method of driving a liquid crystal dimmer plate according to the present invention.
Figure 23B:
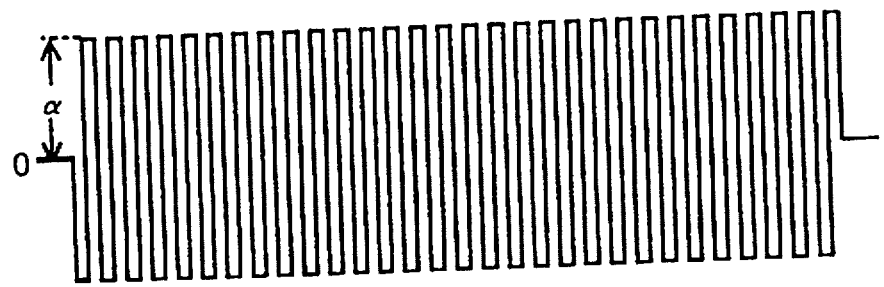
FIG. 23B is a waveform diagram showing an ordinary rectangular waveform.
Figure 24:
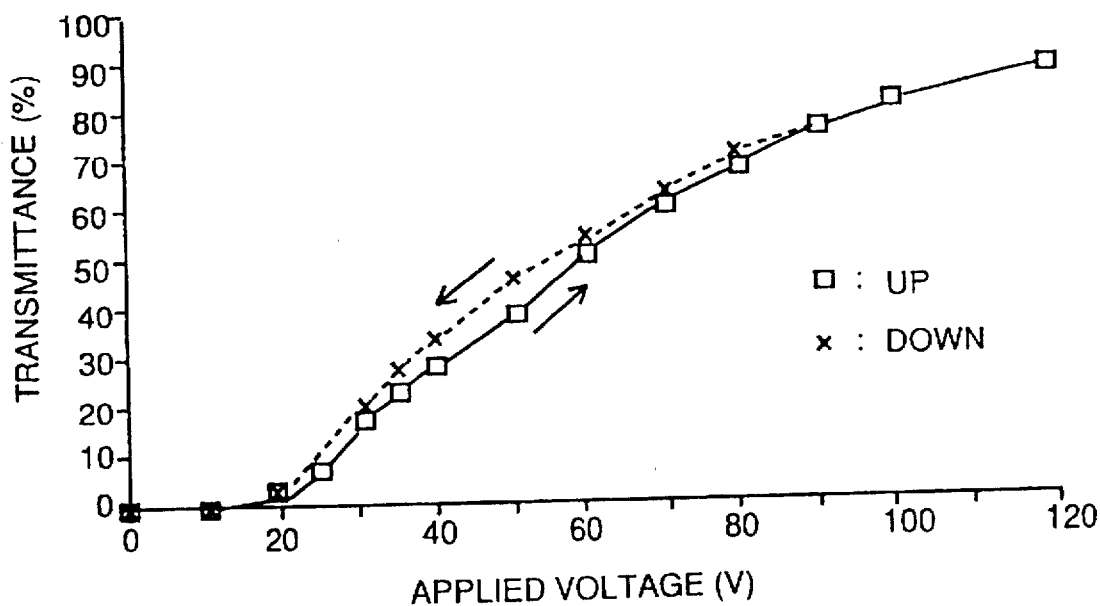
FIG. 24 is a graph illustrating the relation between an applied voltage and the transmittance when applying a voltage having the waveform of FIG. 23A, to the liquid crystal dimmer plate according to Example 3.
Figure 25:
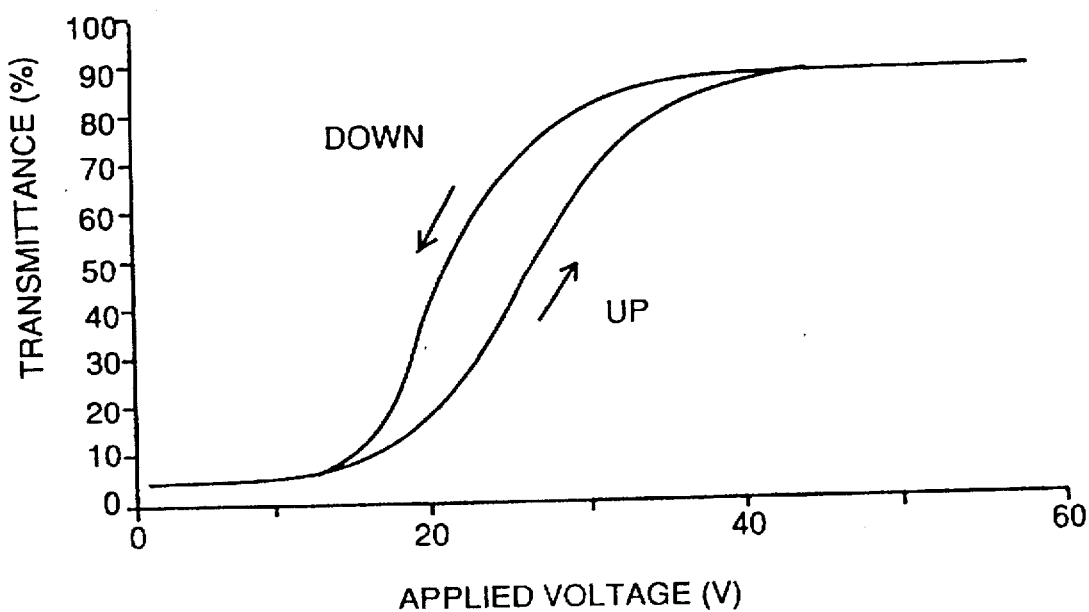
FIG. 25 is a graph illustrating the relation between an applied voltage and the transmittance when applying a voltage having the waveform of FIG. 23B, to the liquid crystal dimmer plate according to Example 3.

Then, changes of the transmittance values for light of a wavelength of 500 nm were measured with a spectrophotometer (type No. UV-160 by Shimadzu Corporation) while raising the voltage, which was applied across the transparent electrodes 11A and 11B of the liquid crystal dimmer plate according to Example 3, stepwise every 2 V from 0 V and lowering the same stepwise every 2 V. FIG. 24 shows the results in a case of applying a voltage of a rectangular wave (frequency: 200 Hz, $t_b$=80 milliseconds) including a component of a zero voltage during a time of $t_a$=20 milliseconds in an intermediate stage as shown in FIG. 23A. FIG. 25 shows the results in a case of applying a voltage of a simple rectangular wave (frequency: 200 Hz) shown in FIG. 23B. The ordinate in FIG. 24 shows values obtained by standardizing the transmittance of the glass substrate to 100%, while the ordinate in FIG. 25 shows values including the transmittance of the glass substrate. On the other hand, the abscissa in FIGS. 24 and 25 how voltage peak values a of the rectangular wave voltages shown in FIGS. 23A and 23B.

As understood from FIGS. 24 and 25, a hysteresis appears in the relation between the applied voltage and the transmittance at stepup and stepdown times when the voltage of a simple rectangular wave is applied, while it is possible to bring the applied voltage and the transmittance into a one-to-one correspondence between stepup and stepdown times when the voltage of the waveform shown in FIG. 23A is applied.

In the liquid crystal dimmer plate according to this embodiment, as hereinabove described, the spectral distribution of the transmitted light can be freely set, while it is possible to obtain an illuminating light the color tone of which is not changed even if the applied voltage is changed. In the liquid crystal dimmer plate according to this embodiment, therefore, it is possible to obtain an illuminating light of a natural color tone not only in a case of two-stage switching between opaque and transparent states but in an intermediate transmission state, and it is expected that this liquid crystal dimmer plate is also applied to an OA product or an AV product.

It is further expected that a lighting a unit employing this liquid crystal dimmer plate may be used to perform a dimmer function for illumination for TV or a motion picture in a studio or outdoors, various illumination apparatuses, room illumination, a projection type television receiver, a motion picture projector, a slide projector or the like.

Figure 26:
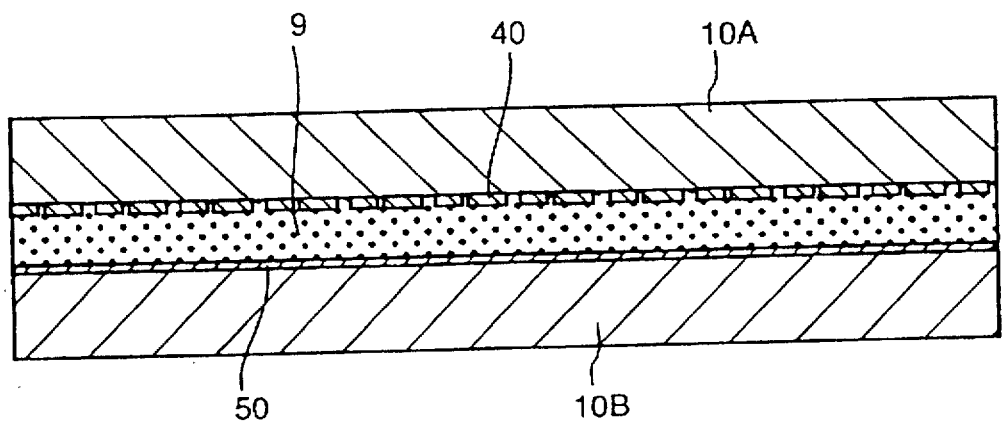
FIG. 26 shows a schematic sectional view of a liquid crystal dimmer plate according to a further embodiment of the present invention.

A liquid crystal dimmer plate according to still another embodiment of the present invention will now be described. As shown in FIG. 26, transparent electrode layers 40 and 50 are formed on inner surfaces of opposite transparent substrates 10A and 10B respectively in the liquid crystal dimmer plate according to this embodiment. A composite layer 9 is held between these transparent electrode layers 40 and 50. The composite layer 9 can be switched between two-stage optical states namely a light scattering state and a light transmitting state, depending on the presence or absence of electrical inputs to the transparent electrode layers 40 and 50.

Figure 27:
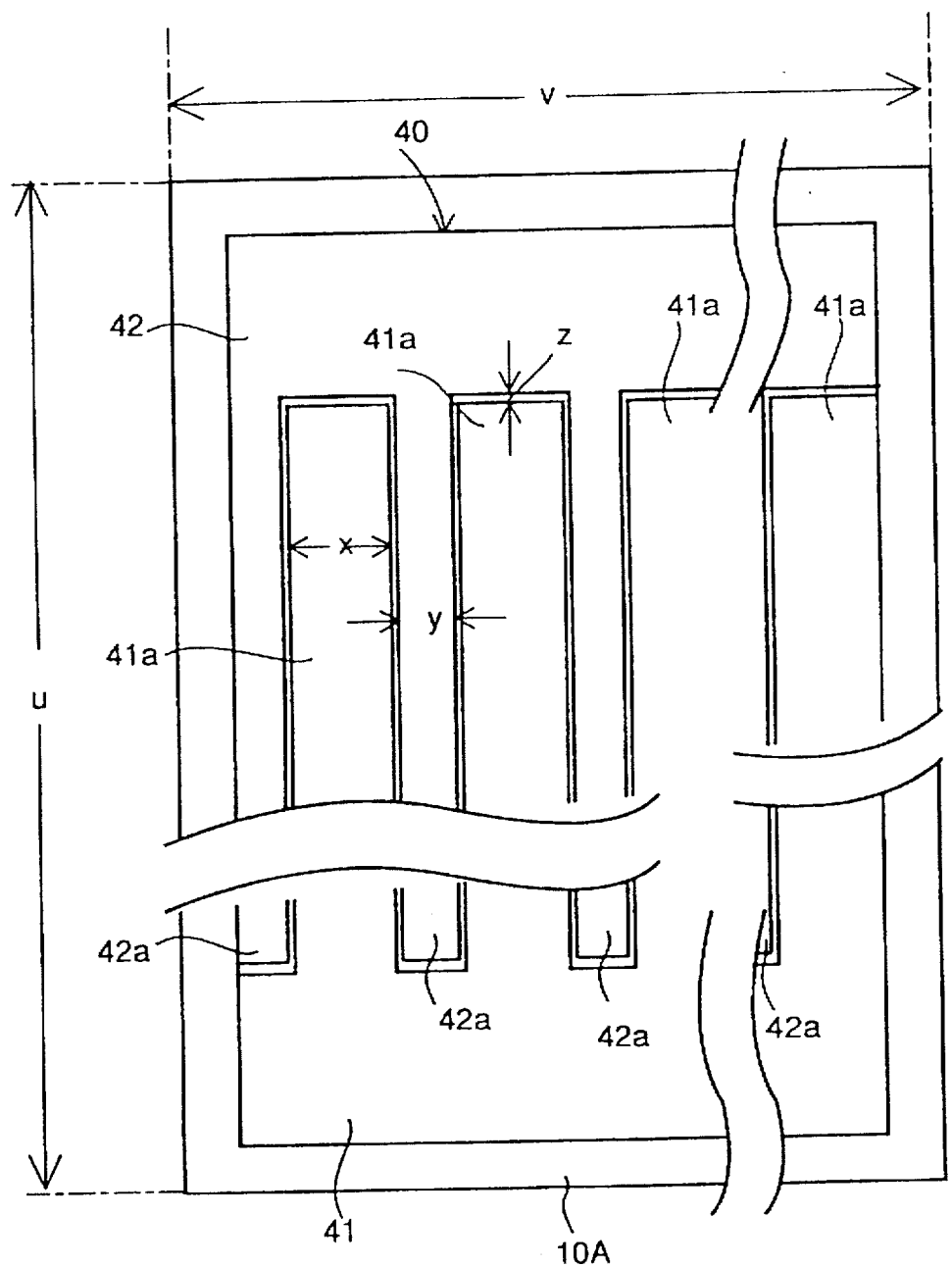
FIG. 27 is a plan view showing one transparent electrode layer in the liquid crystal dimmer plate of FIG. 26.

As shown in FIG. 27, the transparent electrode layer 40 which is formed on the transparent substrate 10A includes a first electrode pattern 41 formed by interconnecting a plurality of elongated rectangular electrode portions 41a in the form of teeth of a comb, and a second electrode pattern 42 formed by interconnecting a plurality of similar elongated rectangular electrode portions 42a in the form of teeth of a comb. These two electrode patterns 41 and 42 are positioned to face each other so that the electrode portions 41a and 42a are alternately arranged in parallel with each other. A width x of each electrode portion 41a of the first pattern 41 is twice a width y of each electrode portion 42a of the second pattern 42. The electrode patterns 41 and 42 are separated from each other through a clearance of a width Z, to be electrically insulated from each other.

Figure 28:
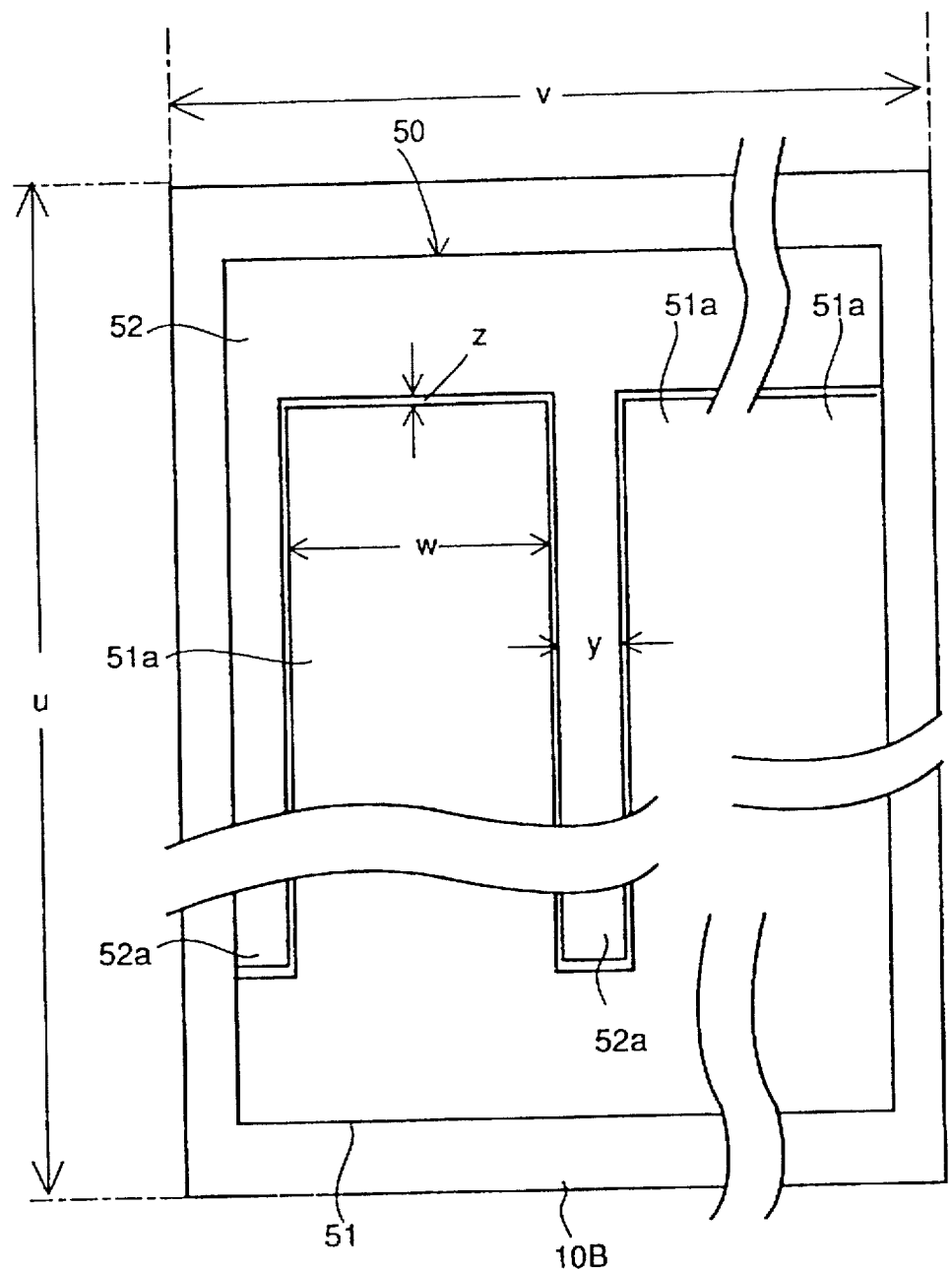
FIG. 28 is a plan view showing another transparent electrode layer in the liquid crystal dimmer plate of FIG. 26.

As shown in FIG. 28, on the other hand, the transparent electrode layer 50 which is formed on the transparent substrate 10B includes a third electrode pattern 51 formed by interconnecting a plurality of elongated rectangular electrode portions 51a in the form of teeth of a comb, and a fourth electrode pattern 52 formed by interconnecting a plurality of similar elongated rectangular electrode portions 52a in the form of teeth of a comb.

These two electrode patterns 51 and 52 are positioned to face each other so that the electrode portions 51a and 52a are alternately arranged in parallel with each other. The electrode portions 52a of the fourth electrode pattern 52 are formed to have the same width y as the electrode portions 42a of the second electrode pattern 42, while a width w of each electrode portion 51a of the third electrode pattern 51 is four times the width y of the electrode portions 52a of the fourth electrode pattern 52. The third and fourth electrode patterns 51 and 52 are separated from each other through a clearance z to electrically insulate these electrode patterns from each other.

Figure 29:
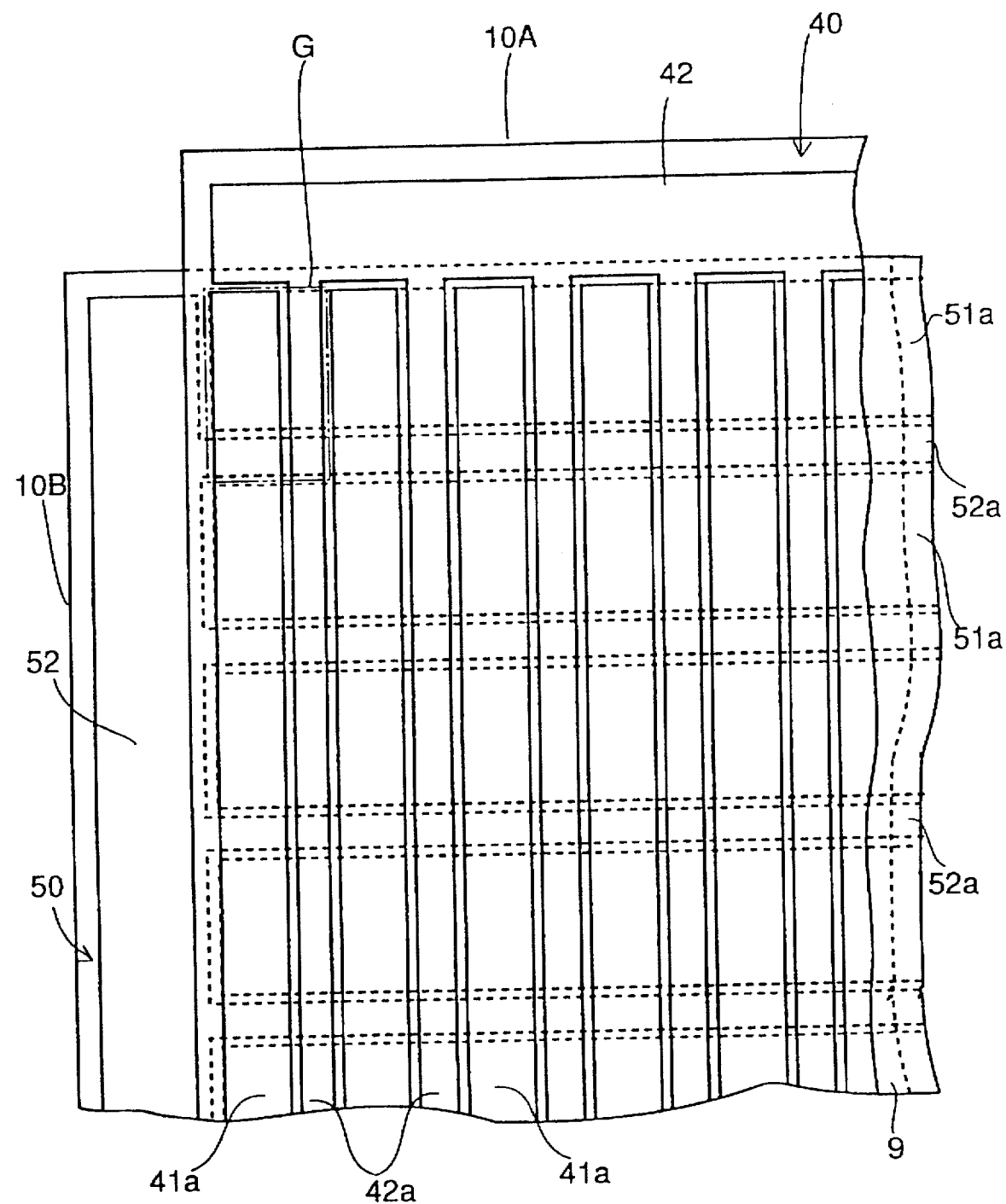
FIG. 29 is a plan view of the liquid crystal dimmer plate shown in FIG. 26.

As shown in FIG. 29, the transparent electrode layers 40 and 50 are so arranged that a group of the electrode portions 41a and 42a and a group of the electrode portions 51a and 52a extend perpendicularly to each other on opposite sides of the composite layer 9. Consequently, a region G enclosed by chain lines, in which a set of the electrode portions 41a and 42a and a set of the electrode portions 51a and 52a are superposed with each other, forms one functional unit, so that a plurality of such functional units G are arranged in the form of a matrix.

Figure 30:
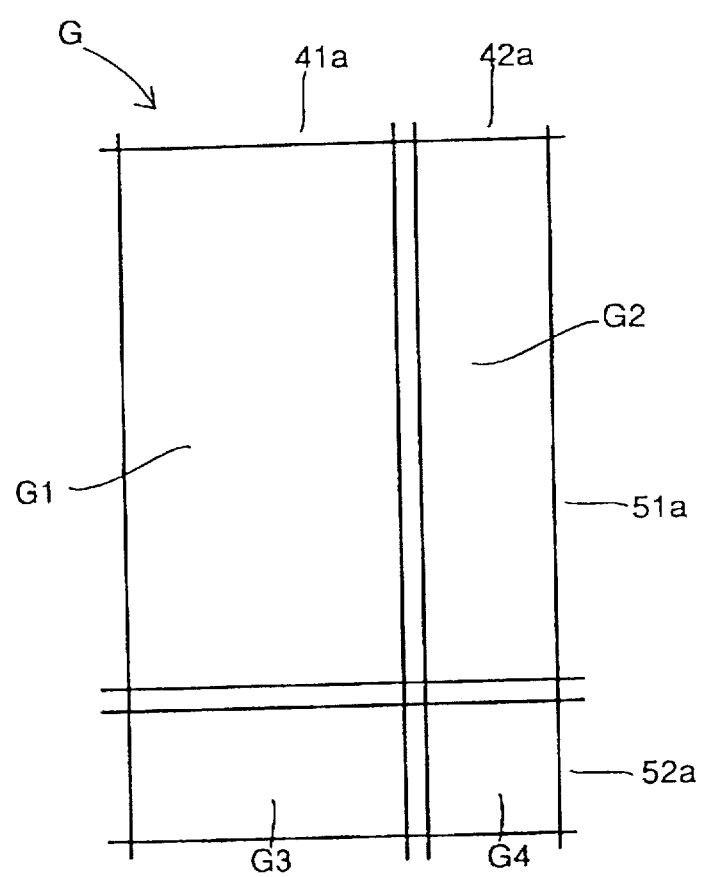
FIG. 30 shows a plan view of one functional unit in the liquid crystal dimmer plate of FIG. 26.

As shown in FIG. 30, each functional unit G includes four types of pixels G1, G2, G3 and G4. The first pixel G1 includes superposed regions of the electrodes 41a and 51; the second pixel G2 includes superposed regions of the electrode portions 42a and 51a; the third pixel G3 includes superposed regions of the electrode portions 41a and 52a; and the fourth pixel G4 includes superposed regions of the electrode portions 42a and 52a. Ratios of areas occupied by the pixels G1, C2, G3 and G4 are 8:4:2:1.

In order to independently switch respective pixels of the pixels G1 to G4 between light scattering and transmission states, electrical inputs are supplied to the electrode portions 41a, 42a, 51a and 52a. As to a method of supplying such electrical inputs, preferably a multiplex driving method is used, which is a method employed in a TN type dot matrix display unit. When this method is applied, an effective value of a voltage of a pixel to be brought into a light scattering state and an effective value of a voltage of a pixel to be brought into a transmission state are controlled into a ratio of 1:2.

Figure 31:
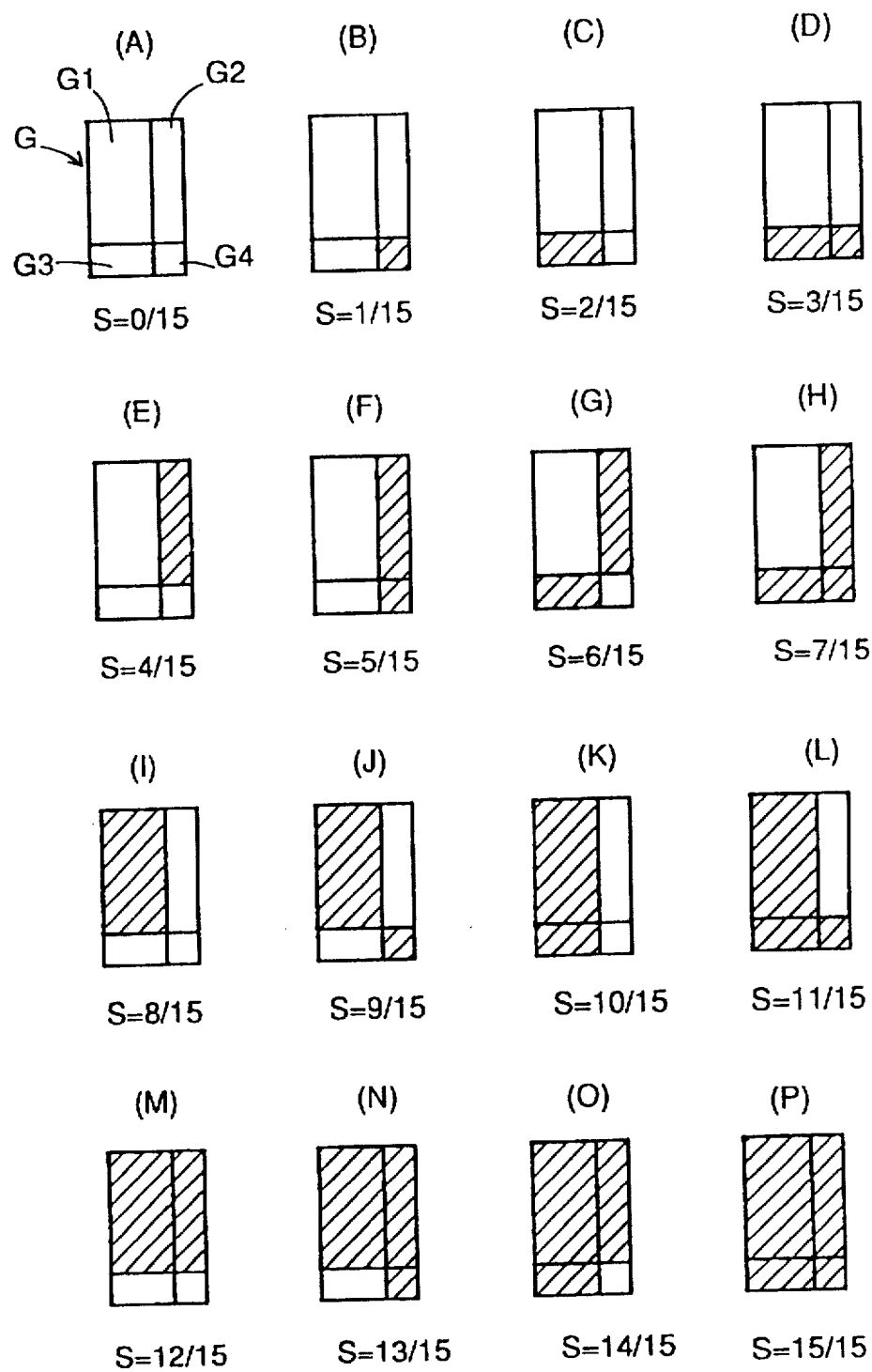
FIG. 31 is a plan view illustrating combinations of optical states of pixels forming the functional units and area ratios of the as-combined pixels.

As shown in FIG. 31, there are 16 combinations of optical states of the pixels G1 to G4, and area ratios S of hatched portions are changed stepwise every ⅟15 from FIG. 31A to FIG. 31P in these combinations. Therefore, transmittance of light in each functional unit G can be adjusted in 16 stages from transmittance (opaque state) with no application of a voltage, to saturation transmittance (transparent state).

While the aforementioned embodiment illustrates a method of carrying out a 16-level light modulation with a pixel number of 4, the pixel number n can be further increased so that respective area ratios are $2^0:2^1:2^2:2^3 \ldots 2^{n-1}$, to carry out a $2^n$-level light modulation. Alternatively, three states including a light scattering state, a transmission state and a half transmission state may be so controlled that respective area ratios are $3^0:3^1:3^2 \ldots 3^{n-1}$, to carry out a $3^n$-level light modulation. Further, switching between at least four states is also included in a range of changed arrangements.

The electrode portion 41a provided in each functional unit G is one of the teeth of a comb forming the first electrode pattern 41 which is included in the transparent electrode layer 40 as hereinabove described, and the electrode portions 41a provided in all functional units G are electrically interconnected. Similarly, the electrode portions 42a are interconnected; the electrode portions 51a are interconnected; and the electrode portions 52a are interconnected among all functional units. As to the aforementioned combinations of the pixels G1 to G4, therefore, the same combinations simultaneously take place on all functional units. Namely, in the liquid crystal dimmer plate according to this embodiment, it is possible to adjust the quantity of light transmitted through the composite layer 9 in 16 stages by combinations of the electrical inputs in the first and second electrode patterns 41 and 42 which are included in the transparent electrode layer 40 and the third and fourth electrode patterns 51 and 52 which are included in the transparent electrode layer 50.

The composite layer 9 can be prepared from a film of resin 7 and liquid crystals 8 dispersed therein as illustrated in relation to FIG. 4 or FIG. 6. Such a composite layer 9 requires no polarizing plate for switching of the light transmission state, whereby no heat is generated by light absorption by such a polarizing plate when the liquid crystal dimmer plate is applied to a lighting unit employing a high intensity light source.

The aforementioned resin 7 may contain an adhesive high polymer, in order to improve adhesion of the composite layer 9 to the transparent electrode layers 40 and 50 for preventing displacement and separation, and to further facilitate implementation of a large area and flexibility of the liquid crystal dimmer plate. Such an adhesive high polymer preferably has a good compatibility with the resin 7, in order to maintain the transparency of the resin 7. When PMMA is employed as the resin 7, for example, a (meth)acrylic type adhesive high polymer can be preferably used.

The transparent conductive layers 40 and 50 can be formed by vapor deposition, sputtering or application. The electrode patterns 41, 42, 51 and 52 can be obtained by employing masks in formation of the transparent electrode layers 40 and 50, or by etching the transparent conductive layers 40 and 50.

A liquid crystal dimmer plate according to Example 5 will now be described. As shown in FIG. 27, first and second electrode patterns 41 and 42 of ITO were formed on a glass substrate 10A by vacuum deposition employing masks. The width of each electrode portion 41a of the first pattern 41 was x=2 mm; the width of each electrode portion 42a of the second pattern 42 was y=1 mm; the width of a clearance between the patterns 41 and 42 was z=0.5 mm; and a vertical size of the glass substrate 10A was u=300 mm while its transverse size was v=280 mm.

Similarly, third and fourth electrode patterns 51 and 52 of ITO were formed on a glass substrate 10B, as shown in FIG. 28. The width of each electrode portion 51a of the third pattern 51 was w=4 mm; the width of each electrode portion 52a of the fourth pattern 52 was y=1 mm; the width of a clearance between the patterns 51 and 52 was z=0.5; and a vertical size of the glass substrate 10B was u=300 mm while its transverse size was v=280 mm.

A composite layer 9 was formed similarly to comparative example 1 in the above Table 1.

Figure 32:
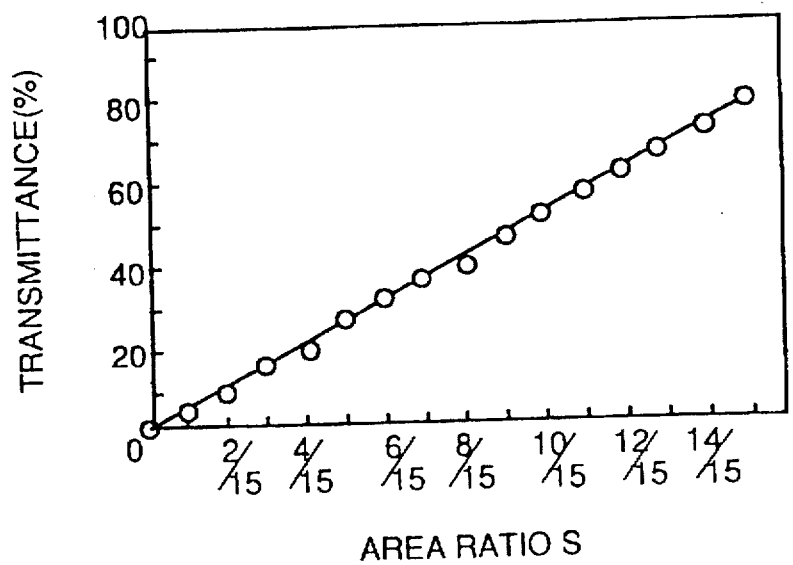
FIG. 32 is a graph illustrating the light transmittance as a function of area ratios in a liquid crystal dimmer plate described in Example 5.

The electrode patterns 41, 42, 51 and 52 were connected to driving circuits, and multiplex driving waveforms were inputted in the electrode portions 41a, 42a, 51a and 52a so that the hatched pixels entered light transmission states and the remaining pixels entered light scattering states in FIG. 31(A) to (P). FIG. 32 shows the light transmittance of the liquid crystal dimmer plate 4 in this case.

Referring to FIG. 32, the abscissa expresses area ratios S (rates occupied by areas in light transmission states in units G) in FIG. 31, and the ordinate expresses the transmittance of the liquid crystal dimmer plate 4. FIG. 32 shows that it was possible to adjust the light transmittance of the liquid crystal dimmer plate 4 from 3% (opaque state) to 80% (transparent state), which is a saturation transmittance, by changing the area ratios S of light transmission states change stepwise in the functional units G.

Figure 33:
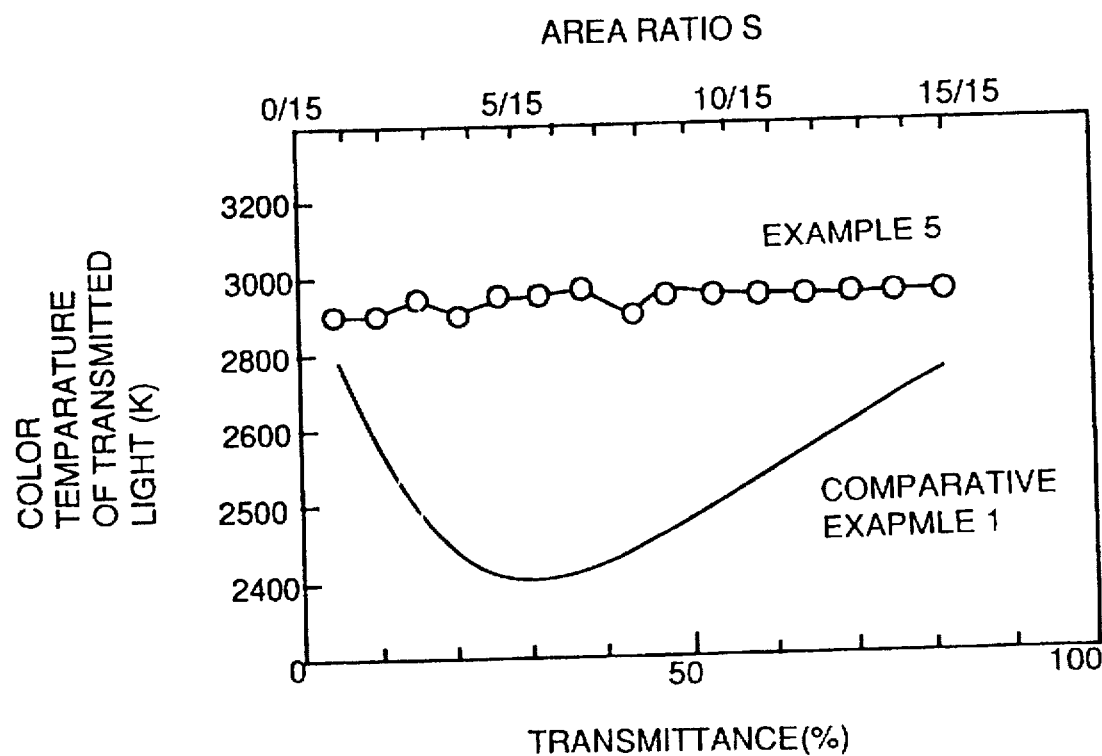
FIG. 33 is a graph illustrating the relations between the light transmittance levels and color temperatures in the liquid crystal dimmer plate described in Example 5 and that according to Comparative Example 1.

FIG. 33 shows the measurement results of color temperatures of transmitted light in respective light modulation stages of the liquid crystal dimmer plate 4 according to Example 5 with a light source 2 which was a tungsten lamp having a color temperature of 3200 K. The upper abscissa in FIG. 33 expresses area ratios S, while the lower abscissa expresses the light transmittance of the liquid crystal dimmer plate 4 in percent. On the other hand, the ordinate expresses the color temperature of the transmitted light. From FIG. 33, it is understood that the color temperature of the light transmitted through the liquid crystal dimmer plate according to Example 5 was substantially constant independently of the transmittance and of the area ratios. On the other hand, a curve of Comparative Example 1 shown in FIG. 33 shows the color temperature of the transmitted light passing through a liquid crystal dimmer plate described as Comparative Example 1 shown in Table 1. The recorded color temperature of Comparative Example 1 fluctuated substantially depending on the transmittance and on the area ratios.

What is claimed is:

1. A lighting system comprising:
   a light source (2) emitting light for illuminating an object to be photographed by a camera having a frame frequency;
   a liquid crystal dimmer plate (4) having control electrodes for scattering a desired quantity of said light from said light source (2); and
   a control power supply (5) connected to said control electrodes of said dimmer plate (4) for generating an alternating control voltage for controlling a light scattering rate of said liquid crystal dimmer plate (4), said control voltage having a frequency corresponding to an integer times said frame frequency of said camera, and
   wherein a part of said light from said light source (2), passes through said liquid crystal dimmer plate (4) without being scattered for illuminating said object, said system further comprising at least one optical lens (17) and an optical diaphragm (18) for selectively eliminating light scattered by said liquid crystal dimmer plate (4).

2. The lighting system in accordance with claim 1, wherein said control electrodes of said liquid crystal dimmer plate (4) include:

two transparent electrodes (11A, 11B), a resin layer (7) held between said transparent electrodes (11A, 11B), and a liquid crystal (8) dispersed in said resin layer (7), said liquid crystal including at least one of a nematic liquid crystal, a cholesteric liquid crystal and a smectic liquid crystal, said resin layer (7) having a refractive index equivalent to an ordinary light refractive index of said liquid crystal (8).

3. The lighting system in accordance with claim 1, wherein said liquid crystal dimmer plate (4) comprises:

two transparent electrodes (11A, 11B), a resin layer (7) held between said transparent electrodes (11A, 11B), and a liquid crystal material (8) dispersed in said resin layer (7), said liquid crystal material (8) including a cholesteric phase, wherein said liquid crystal material (8) having said cholesteric phase is a chiral nematic liquid crystal prepared by adding a chiral component to a nematic liquid crystal, and wherein a concentration of said chiral component is so adjusted that a transmittance for light in a shorter wavelength region is substantially identical to or larger than a transmittance for light in a longer wavelength region even if said control voltage applied across said transparent electrodes (11A, 11B) is changed.

4. The lighting system in accordance with claim 1, wherein a dielectric multilayer film (16) for transmitting visible light included in said light from said light source (2) and for reflecting at least one of infrared rays and ultraviolet rays, is positioned between said light source (2) and said liquid crystal dimmer plate (4).

5. The lighting system in accordance with claim 1, further comprising a dielectric multilayer film positioned for transmitting at least one of infrared rays and ultraviolet rays included in said light from said light source (2) and to reflect visible light toward said liquid crystal dimmer plate (4).

6. The lighting system in accordance with claim 1, further comprising a cylindrical casing (15) for mounting said light source (2) and said liquid crystal dimmer plate (4), said casing (15) having an opening for passing illuminating light (13) through said liquid crystal dimmer plate (4) and through said opening to the exterior.

7. The lighting system in accordance with claim 2, wherein said resin layer (7) held between said transparent electrodes (11A, 11B) is a transparent resin layer.

8. The lighting system in accordance with claim 2, further comprising a cylindrical casing (15) for mounting said light source (2) and said liquid crystal dimmer plate (4), said casing (15) having an opening for passing illuminating light (13) through said liquid crystal dimmer plate (4) and through said opening to the exterior.

9. The lighting system in accordance with claim 3, further comprising a cylindrical casing (15) for mounting said light source (2) and said liquid crystal dimmer plate (4), said casing (15) having an opening for passing illuminating light (13) through said liquid crystal dimmer plate (4) and through said opening to the exterior.

10. The lighting system in accordance with claim 4, further comprising a cylindrical casing (15) for mounting said light source (2) and said liquid crystal dimmer plate (4), said casing (15) having an opening for passing illuminating light (13) through said liquid crystal dimmer plate (4) and through said opening to the exterior.

11. The lighting system in accordance with claim 5, further comprising a cylindrical casing (15) for mounting said light source (2) and said liquid crystal dimmer plate (4), said casing (15) having an opening for passing illuminating light (13) through said liquid crystal dimmer plate (4) and through said opening to the exterior.

* * * * *

UNITED STATES PATENT AND TRADEMARK OFFICE
CERTIFICATE OF CORRECTION

PATENT NO. : 5,764,316
DATED : June 9, 1998
INVENTOR(S) : Takizawa et al.

It is certified that error appears in the above-identified patent and that said Letters Patent is hereby corrected as shown below:

On the title page,
FOREIGN PATENT DOCUMENTS, line 3, replace "5/1973" by --5/1974--;
OTHER PUBLICATIONS, line 5, after "SPIE-" replace "Liqid" by --Liquid--;

On page 2 of the title page,
FOREIGN PATENT DOCUMENTS, after line 7 insert the following:
1-285921   11/1989   Japan

| Col. 2, | line 39, | after "the" replace "Liquid" by --liquid--; |
|---|---|---|
|  | line 64, | after "electrode" replace "Layers" by --layers--; |
| Col. 8, | line 55, | after "Such" replace "discontinues" by --discontinuous--; |
|  | line 58, | after "Such" replace "discontinues" by --discontinuous--; |
| Col. 10, | line 45, | after "symbol" replace "C" by --$\overset{*}{C}$--; |
| Col. 13, | line 21, | after "values" replace "a" by --$\alpha$--; |

UNITED STATES PATENT AND TRADEMARK OFFICE
CERTIFICATE OF CORRECTION

PATENT NO. : 5,764,316
DATED : June 9, 1998
INVENTOR(S) : Takizawa et al.

It is certified that error appears in the above-identified patent and that said Letters Patent is hereby corrected as shown below:

| Col. 14, | line 5,  | before "of" (first occurrence) replace "x" by --$\underline{x}$--; |
|          | line 6,  | after "width" replace "y" by --$\underline{y}$--; |
|          | line 22, | after "width" replace "y" by --$\underline{y}$--; |
|          | line 23, | after "width" replace "w" by --$\underline{w}$--; |
|          | line 25, | after "width" replace "y" by --$\underline{y}$--; |
|          | line 28, | after "clearance" replace "z" by --$\underline{z}$--; |
| Col. 15, | line 3,  | after "number"(second occurrence) replace "n" by --$\underline{n}$--. |

Signed and Sealed this

First Day of September, 1998

Attest:

BRUCE LEHMAN

*Attesting Officer*   *Commissioner of Patents and Trademarks*